(12) United States Patent
Anagnoson

(10) Patent No.: US 8,650,052 B1
(45) Date of Patent: Feb. 11, 2014

(54) CONFIGURABLE INSURANCE POLICY FORMS INFERENCE

(75) Inventor: Robert Theodore Anagnoson, San Mateo, CA (US)

(73) Assignee: Guidewire Software, Inc., Foster City, CA (US)

( * ) Notice: Subject to any disclaimer, the term of this patent is extended or adjusted under 35 U.S.C. 154(b) by 0 days.

(21) Appl. No.: 13/432,846

(22) Filed: Mar. 28, 2012

(51) Int. Cl.
*G06Q 40/00* (2012.01)

(52) U.S. Cl.
USPC .................. 705/4; 705/36 R; 706/45; 706/47; 715/762

(58) Field of Classification Search
USPC .................. 705/4, 36 R; 706/45, 47; 715/762
See application file for complete search history.

(56) References Cited

U.S. PATENT DOCUMENTS

| | | | |
|---|---|---|---|
| 8,380,533 B2 * | 2/2013 | Reicher et al. ..................... 705/2 |
| 2007/0250783 A1 * | 10/2007 | Wu et al. ........................ 715/762 |
| 2008/0209037 A1 * | 8/2008 | Zernik et al. .................. 709/225 |
| 2009/0024637 A1 * | 1/2009 | Krishna et al. .................. 707/10 |
| 2011/0302484 A1 * | 12/2011 | Abdelaquil et al. .......... 715/224 |
| 2012/0163594 A1 * | 6/2012 | Moon et al. .................... 380/200 |

OTHER PUBLICATIONS

"Inference Networks for Document Retrieval"; A Dissertation Presented by Howard Robert Turtle; Feb. 1991.*

* cited by examiner

*Primary Examiner* — Harish T. Dass
(74) *Attorney, Agent, or Firm* — Van Pelt, Yi & James LLP

(57) ABSTRACT

Providing configuration of inference logic for insurance policy forms is disclosed, including: presenting to a user: information associated with an insurance policy form; and a set of inference rule types, each inference rule type specifying a corresponding condition under which the form is to be created; receiving a selected inference rule type; presenting a set of insurance product definition templates; receiving a selected insurance product definition template corresponding to the selected inference rule type, the selected insurance product definition template being selected from the set of insurance product definition templates; and storing a mapping associated with the insurance policy form, wherein the mapping includes at least the selected inference rule type and the selected insurance product definition template.

20 Claims, 24 Drawing Sheets

| FORM | POLICY LINE | INFERENCE RULE TYPE | INSURANCE PRODUCT DEFINITION TEMPLATES |
|---|---|---|---|
| PP 0004 | Personal auto | Coverage term limit | Coverage: "Towing and Labor"; Coverage Term Limit value: "$100" |
| SFG5H43 | Homeowner | Exclusion | Peril value: "Fire and Lightning" |
| 63_AD427_FG | Personal auto | Coverage | Coverage: "Medical payment" |
| GH2378KSS | Personal auto | Coverage | Coverage: "Towing and Labor" |
| | | Typelist value | Covered object: "Personal vehicle"; Selected Field: "BodyType"; Selected Value: "Pickup truck" |
| 4RRKS90 | Homeowner | No additional criteria | N/A |
| ... | ... | ... | ... |

POLICY FORM PATTERNS

FORM NUMBER
FORM NAME
PRODUCT  PERSONAL AUTO ▼
GROUP CODE

[SEARCH] [RESET]

SEARCH RESULTS (151-160 OF 160)

[ADD] [DUPLICATE] [DELETE]

802

PAGE [11 ▼] OF 11 | PREV | NEXT

| | CODE | NUMBER | EDITION | NAME | GROUP CODE |
|---|---|---|---|---|---|
| ☐ | PA04480105_NE | PA 0448 | 0105 | UN/UNDER INSURED MOTORISTS | UNINSURED |
| ☐ | PA04490105_WV | PA 0449 | 0105 | UN/UNDER INSURED MOTORISTS | UNINSURED |
| ☐ | PA04510601_HI | PA 0451 | 0601 | FEDERAL EMPLOYEE USING AUTOS IN GOVT BUSINESS | |
| ☐ | PP_0004 | PP 0004 | 0100 | TOWING AND LABOR COSTS COVERAGE | PP0004 |
| ☐ | PP_0005 | PP 0005 | 0100 | EXCESS ELECTRONIC EQUIPMENT COVERAGE | |
| ☐ | PP_1589 | PP 1589 | 0100 | EXCLUSION - NAMED DRIVER | 1589 |
| ☐ | REMOVE_PP_0004 | REMOVE PP 0004 | 0100 | REMOVE PERSONAL AUTO ENDORSEMENT | |
| ☐ | ALWAYSADDED | 1 | 1 | ALWAYS ADDED | |
| ☐ | ALWAYSADDEDEVERYJOB | 1COPY | 1 | ALWAYS ADDED EVERY JOB | |
| ☐ | ALWAYSADDEDSTATIC | 1COPYCOPY | 1 | ALWAYS ADDED (STATIC XML) | |

| FORM PATTERN: PP 0004 - 0100 [PP_0004] (UP TO POLICY FORM PATTERNS) — 902 |
|---|

[EDIT] [DELETE]

| BASICS | PRODUCTS | JOBS | JURISDICTIONS | POLICY CHANGE | INFERENCE |
|---|---|---|---|---|---|

| | | |
|---|---|---|
| CODE 904 908 | | PP_0004 906 |
| NUMBER | | PP 0004 |
| EDITION | | 0100 |
| NAME | | TOWING AND LABOR COSTS COVERAGE |
| ANY DATA RELATED TO THIS FORM COLLECTED AFTER QUOTE? | | NO |
| ASSIGN AN ENDORSEMENT NUMBER TO THIS FORM? | | YES |
| PRIORITY | | 10 |

910　912

INTEGRATION FIELDS

REFERENCE CODE _____

FIG. 9

| FORM PATTERN: PP 0004 - 0100 [PP_0004] (UP TO POLICY FORM PATTERNS) |
|---|

[UPDATE] [CANCEL]

| BASICS | PRODUCTS | JOBS | JURISDICTIONS | POLICY CHANGE | INFERENCE |

FORMS ARE ONLY INFERRED WHEN PRODUCT, JOB, AND JURISDICTION CRITERIA ALSO MATCH.

POLICY LINE * [PERSONAL AUTO LINE ▼] — 1002

FORM INFERENCE CONDITIONS [SELECTED COVERAGE, CONDITION, OR EXCLUSION ▼] — 1008, 1012

MUST IT EXIST ON ALL INSTANCES OF THE COVERED OBJECT? * ⦿ YES ○ NO — 1010

COVERAGE, CONDITION, OR EXCLUSION *  [          ] 🔍 — 1016

CHANGES TO ANY OF THESE VALUES REQUIRE THE FORM TO BE UPDATED MID-TERM

COVERAGE TERMS

[ADD ▼] [REMOVE]

| NAME | DESCRIPTION | CODE |
|---|---|---|

COVERED OBJECT FIELDS

[ADD ▼] [REMOVE]

| * NAME | * DATA TYPE |
|---|---|

FIG. 10

SELECTED COVERAGE, CONDITION, OR EXCLUSION IS USED (RETURN TO FORM PATTERN: PP 0004 - 0100 IPP 0004)

TYPE  *○ CONDITION ⊙ COVERAGE ○ EXCLUSION ←—1102

KEYWORD [          ]  ←—1104

[SEARCH] [RESET]

PAGE [2 ▼] OF 3 | PREV | NEXT

| | COVERAGE | CATEGORY | TYPE |
|---|---|---|---|
| SELECT | TOWING AND LABOR | PERSONAL AUTO PHYSICAL DAMAGE GROUP | COVERAGE |
| SELECT | DEATH & DISABILITY BENEFIT | PERSONAL INJURY | COVERAGE |
| SELECT | PIP - ARKANSAS | PERSONAL INJURY | COVERAGE |
| SELECT | PIP - DISTRICT OF COLUMBIA | PERSONAL INJURY | COVERAGE |
| SELECT | PIP - DELAWARE | PERSONAL INJURY | COVERAGE |
| SELECT | PIP - FLORIDA | PERSONAL INJURY | COVERAGE |
| SELECT | PIP - HAWAII | PERSONAL INJURY | COVERAGE |
| SELECT | PIP - KANSAS | PERSONAL INJURY | COVERAGE |
| SELECT | PIP - KENTUCKY | PERSONAL INJURY | COVERAGE |
| SELECT | PIP - MASSACHUSETTS | PERSONAL INJURY | COVERAGE |
| SELECT | PIP - MARYLAND | PERSONAL INJURY | COVERAGE |
| SELECT | PIP - MICHIGAN | PERSONAL INJURY | COVERAGE |
| SELECT | PIP - MINNESOTA | PERSONAL INJURY | COVERAGE |
| SELECT | PIP - NORTH DAKOTA | PERSONAL INJURY | COVERAGE |

| BASICS | PRODUCTS | JOBS | JURISDICTIONS | POLICY CHANGE | INFERENCE |

FORMS ARE ONLY INFERRED WHEN PRODUCT, JOB, AND JURISDICTION CRITERIA ALSO MATCH.

POLICY LINE     * PERSONAL AUTO LINE ▾

FORM INFERENCE CONDITIONS    SELECTED COVERAGE, CONDITION, OR EXCLUSION IS USED ▾ — 1202

MUST IT EXIST ON ALL INSTANCES OF THE COVERED OBJECT? ○ YES ● NO

COVERAGE, CONDITION, OR EXCLUSION    * TOWING AND LABOR 🔍 — 1204

CHANGES TO ANY OF THESE VALUES REQUIRE THE FORM TO BE UPDATED MID-TERM

COVERAGE TERMS

[ADD] [REMOVE]

| | NAME — 1206 | DESCRIPTION | CODE |
|---|---|---|---|
| ☐ | TOWING AND LABOR LIMIT | TOWING AND LABOR LIMIT | TOWINGANDLABORLIMIT |

COVERED OBJECT FIELDS

[ADD ▾] [REMOVE]

| | * NAME — 1208 | * DATA TYPE |
|---|---|---|
| ☐ | BASISAMOUNT — 1210 | INTEGER |
| ☐ | LICENSEPLATE | STRING |

FIG. 12

FORM PATTERN: PP 0004 - 0100 [PP_0004] (UP TO POLICY FORM PATTERNS)

[UPDATE] [CANCEL]

[BASICS] [PRODUCTS] [JOBS] [JURISDICTIONS] [POLICY CHANGE] [INFERENCE]

FORMS ARE ONLY INFERRED WHEN PRODUCT, JOB, AND JURISDICTION CRITERIA ALSO MATCH.

POLICY LINE    * [PERSONAL AUTO LINE ▶]

FORM INFERENCE CONDITIONS

COVERED OBJECT —1404    [SELECTED TYPELIST VALUE IS CHOSEN]  —1404

SELECTED FIELD —1406    * [PERSONAL VEHICLE ▶]  —1410

SELECTED VALUE —1408    * [BODY TYPE ▶]  —1412

* [PICKUP TRUCK ▶]  —1414

MUST IT EXIST ON ALL INSTANCES OF THE COVERED OBJECT? * ○ YES ⊙ NO

| FORM | POLICY LINE | INFERENCE RULE TYPE | INSURANCE PRODUCT DEFINITION TEMPLATES | MIDTERM UPDATE VALUES |
|---|---|---|---|---|
| PP 0004 | Personal auto | Coverage | Coverage: "Towing and Labor" | Coverage Term Limit "Towing and Labor Limit"; Covered Object Fields BasisAmount or LicensePlate |
| | | Typelist value | Covered object: "Personal vehicle"; Selected Field: "BodyType"; Selected Value: "Pickup truck" — 1504 | N/A |

☑ LIABILITY - BODILY INJURY AND PROPERTY DAMAGE
AUTO LIABILITY PACKAGE  * 15/30/5 ▶

☑ MEDICAL PAYMENTS
MEDICAL LIMIT  * 5,000 ▶

☐ UNINSURED MOTORIST - BODILY INJURY
☐ UNINSURED MOTORIST - PROPERTY DAMAGE
☐ UNDERINSURED MOTORIST - PROPERTY DAMAGE
☑ MEXICO COVERAGE - LIMITED

COVERAGE APPLIED PER VEHICLE IN CALIFORNIA

| VEHICLE # ▲ | DESCRIPTION | COMPREHENSIVE | COLLISION | TOWING LABOR | RENTAL |
|---|---|---|---|---|---|
| ▲ 1 | 2000 ACURA RL | NOT SELECTED | NOT SELECTED | SELECTED | NOT SELECTED |

COVERAGE DETAILS
☐ COMPREHENSIVE
☐ COLLISION
☑ TOWING AND LABOUR
TOWING AND LABOR LIMIT  * 100 ▶ — 1704
☐ RENTAL REIMBURSEMENT

| FORM | POLICY LINE | INFERENCE RULE TYPE | INSURANCE PRODUCT DEFINITION TEMPLATES | MIDTERM UPDATE VALUES |
|---|---|---|---|---|
| PP 0004 | Personal auto | Coverage term limit value | Coverage: "Towing and Labor"; Coverage term limit value: "100" | Coverage Term Limit "Towing and Labor Limit"; Covered Object Fields BasisAmount or LicensePlate |

☆ SUBMISSION (QUOTED) | 🚗 PERSONAL AUTO | EFF. 01/30/2012 | JIMBO JONES | ACCOUNT # 6067124733 | UNDERWRITER: CHRISTINE CRAFT | JOB UNDER UW REVIEW

FORMS

[ <BACK ] [ NEXT > ] [ RELEASE LOCK ] [ EDIT WORK ORDER ] [ VERSIONS ▼ ] [ BIND OPTIONS ▼ ] [ CLOSE OPTIONS ▼ ]

FORMS

| FORM # ⬍ | DESCRIPTION | ENDORSEMENT # ▲ | REPLACING # |
|---|---|---|---|
| 1 | ALWAYS ADDED | | |
| 1COPY | ALWAYS ADDED EVERY JOB | | |
| 1COPYCOPY | ALWAYS ADDED (STATIC XML) | | |
| PA 00DS | DEC SHEET | | |
| PA 0208 | LIMITED MEXICO COVERAGE | | |
| PA 0272 | PERSONAL AUTO POLICY | | |
| PF 01 | COMMON POLICY CONDITIONS | | |
| PP 0004 | TOWING AND LABOR COSTS COVERAGE | | |

CONFIGURABLE INSURANCE POLICY FORMS INFERENCE

BACKGROUND OF THE INVENTION

During the life cycle of an insurance policy, various standard and/or custom insurance policy forms are needed to be printed for the policyholder. Each insurance policy form can include one or more paper or digital documents. The insurance policy forms can simply inform the policyholder of the terms and conditions of their policy and/or require submission of additional information from the policyholder (e.g., signature). The forms can be standard or be customized by insurance carriers. In existing systems, the determination of relevant forms can be a complicated process. Depending on the specifics of the policy, different forms may be used. For example, a policyholder that has collision coverage as part of his or her policy may receive a form associated with collision coverage. However, in existing systems, the logic between forms and the criteria for which they will be printed are stored as part of computer program code that are infrequently updated and/or are not very accessible to those with little to no computer programming experience.

BRIEF DESCRIPTION OF THE DRAWINGS

Various embodiments of the invention are disclosed in the following detailed description and the accompanying drawings.

FIG. 5 is an example table that is used to store sets of configured inference logic for various insurance policy forms.

FIG. 6B shows an example of a user interface for configuring a product model.

FIG. 6C shows an example of a user interface for configuring a product model.

FIG. 8 shows an example of a user interface for selecting a particular insurance policy form.

FIG. 9 shows an example of a user interface that includes information associated with a selected insurance policy form.

FIG. 10 shows an example of a user interface that includes inference logic configuration for a selected form.

FIG. 11 shows an example of a user interface that includes a list of coverages associated with inference logic configuration for a selected form.

FIG. 12 shows an example of a user interface that includes inference logic configuration for a selected form.

FIG. 14 shows an example of a user interface that includes inference logic configuration for a selected form.

FIG. 15 is an example of an entry of a table that is used to store sets of configured inference logic for the selected form.

FIG. 17 shows an example of a user interface associated with writing a policy instance.

FIG. 19 is an example of an entry of a table that is used to store sets of configured inference logic for the form "PP 0004."

FIG. 20 shows and example of a user interface presenting a list of insurance policy forms that have been inferred for Jimbo Jones.

DETAILED DESCRIPTION

Figure 1:
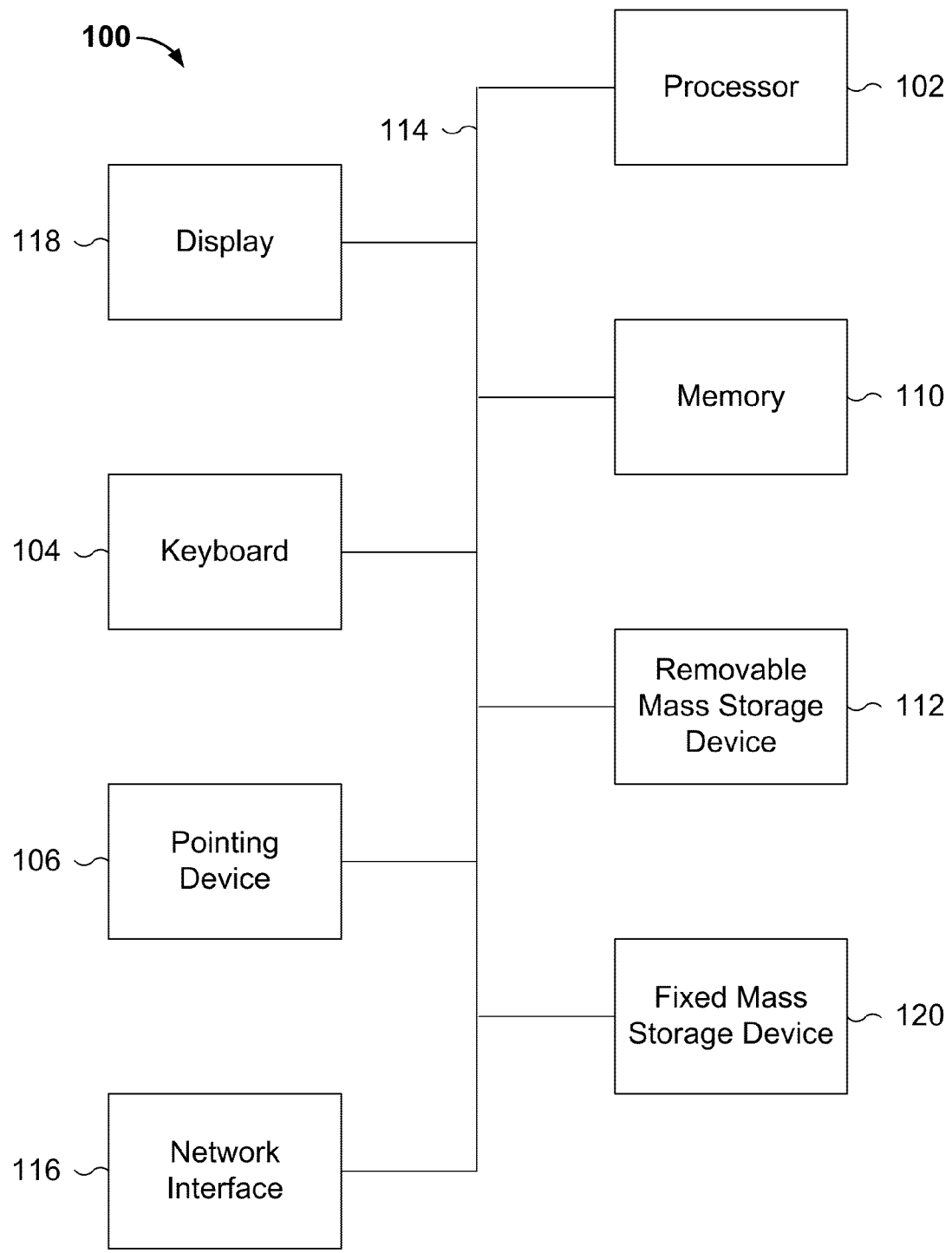
FIG. 1 is a functional diagram illustrating an embodiment of a programmed computer system for providing configuration for inference logic of insurance policy forms.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing configuration of inference logic of insurance policy forms is disclosed. As used herein, inference refers to the determination of which forms are to be printed (e.g., for a particular policyholder). In some embodiments, the inference of relevant forms for a policyholder is determined based at least in part on that particular policyholder's policy. In various embodiments, a set of inference logic is configured for each insurance policy form of a plurality of insurance policy forms. In some embodiments, configuration of the set of inference logic is performed using a user interface (e.g., by an administrator who works for the insurance carrier and has special privileges) to present predefined selections. In some embodiments, configuration of the set of inference logic includes defining selections to be presented at the user interface. In some embodiments, the set of inference logic for a particular insurance policy form includes a mapping of at least a particular inference rule type and at least one selection corresponding to that type (e.g., an associated insurance coverage template). An inference rule type, in various embodiments, comprises a type of condition under which the associated insurance policy form is included for printing. For example, an inference rule type can be to require a particular coverage to be included in a policyholder's insurance policy. In some embodiments, selections corresponding to the inference rule type comprise specific conditions of that type (if more than one such specific condition exists). For example, the selections that correspond to the inference rule type of requiring a particular coverage to be included in a policyholder's insurance policy can be a list of specific coverages.

In the discussions below, embodiments of insurance policy forms management platforms that utilize insurance product definition templates, insurance product models, and policy instances to make inferences about forms are described. An insurance product definition template, in various embodiments, comprises an attribute/object/value that can be configured (e.g., by an insurance carrier representative) to be included in an insurance product model. An insurance product model, in various embodiments, comprises a set of metadata, one or more data structures, and/or computer program code that define the structure of attributes/objects in insurance policies and are used to write policy instances for insurance customers (policyholders). For example, an insurance product definition template can be a particular type of coverage (e.g., collision coverage), a particular type of coverage limit (e.g., a collision coverage term limit of $15K), a particular type of policy line (e.g., personal auto), a particular type of deductible (e.g., a deductible of $500), or a particular type of exclusion (e.g., intentional damage or/and injury) from coverage. A policy instance is the policy contract between an insurance carrier that designed the product model and a specific insurance customer and so includes at least some of the insurance product definition templates included in that product model.

In some embodiments, separate from or in addition to the selections of an inference rule type and a corresponding selection thereof, a particular policy line is selected from the policy lines available/allowable in the product model to be a part of the set of inference logic configured for an insurance policy form. In some embodiments, if an insurance product definition template for a particular policy line is selected for a set of inference logic, the selected policy line acts like an additional filter such that the selections corresponding to the selected type of inference rule are filtered based on only those selections that are associated with the selected policy line. Where a separate policy line insurance product definition template is selected for an insurance policy form, that selected policy line may, in some embodiments, be included in the stored mapping among the particular inference rule type and at least one selection corresponding to that type stored for that insurance policy form.

In various embodiments, at a designated event (e.g., creation of a policy instance) at which form inference is to be performed for a policyholder (i.e., a determination as to which insurances are to be selected to be printed for the policyholder), the inference logic of each of the existing set of insurance policy forms is compared to the policy instance corresponding to that policyholder to determine whether the inference logic matches at least a portion of the policy instance. In the event that the inference logic of a particular insurance policy form matches at least a portion of the policy instance, then that insurance policy form is considered to be inferred for the policy instance and is therefore determined to be included in printing.

FIG. 1 is a functional diagram illustrating an embodiment of a programmed computer system for providing configuration for inference logic of insurance policy forms. As will be apparent, other computer system architectures and configurations can be used to configure inference logic of insurance policy forms. Computer system 100, which includes various subsystems as described below, includes at least one microprocessor subsystem (also referred to as a processor or a central processing unit (CPU) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide configuration of inference logic for insurance policy forms.

Processor 102 is coupled bi-directionally with memory 110, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100 and is coupled either bi-directionally (read/write) or uni-directionally (read only) to processor 102. For example, storage 112 can also include computer readable media such as magnetic tape, flash memory, PC-CARDS, portable mass storage devices, holographic storage devices, and other storage devices. A fixed mass storage 120 can also, for example, provide additional data storage capacity. The most common example of fixed mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a non-transitory computer readable medium that includes program code for performing various computer-implemented operations. The computer readable medium is any data storage device that can store data which can thereafter be read by a computer system. Examples of non-transitory computer readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
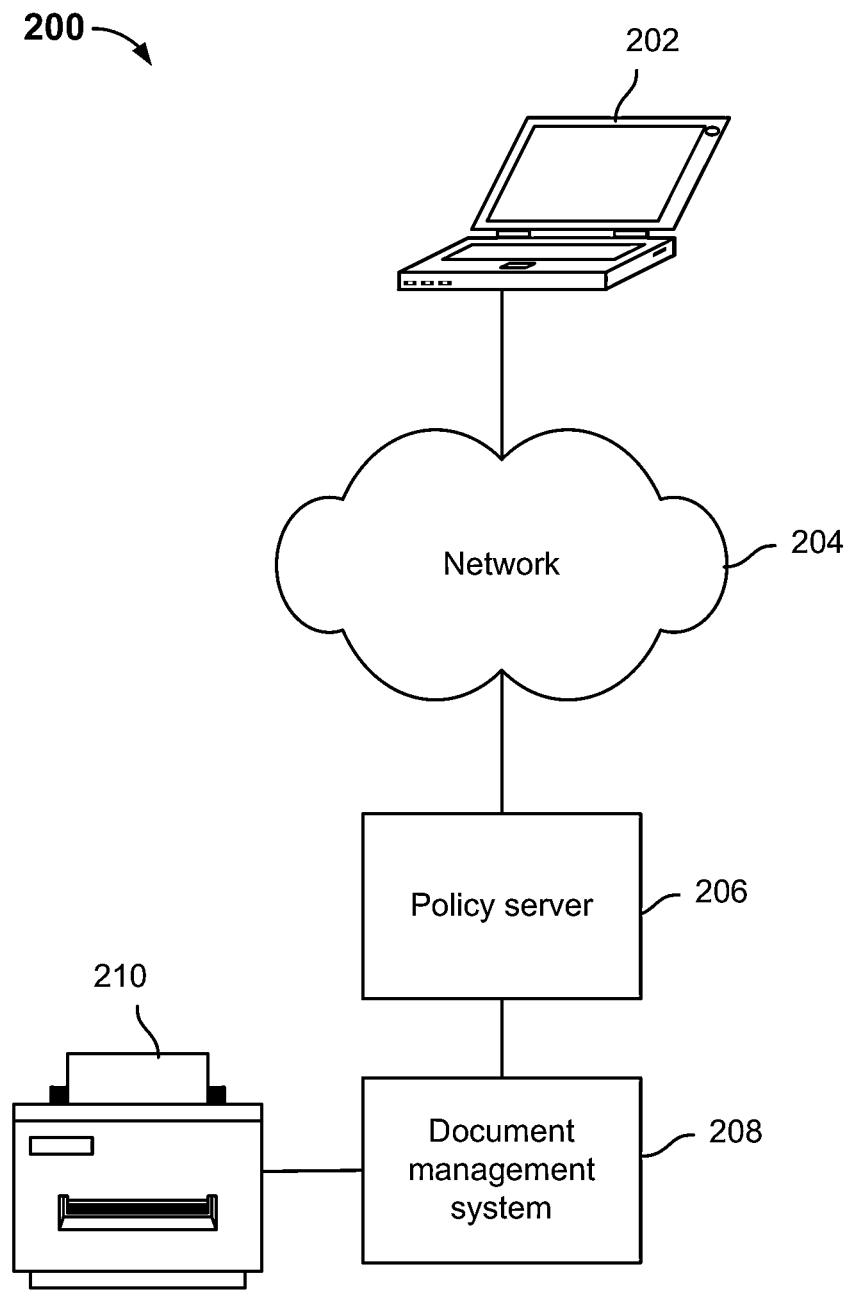
FIG. 2 is a diagram of an embodiment of a system for providing configuration of inference logic for insurance policy forms.

FIG. 2 is a diagram of an embodiment of a system for providing configuration of inference logic for insurance policy forms. In the example, system 200 includes device 202, network 204, policy server 206, document management system 208, and printer 210. Network 204 includes high-speed telecommunications and/or data networks. In some embodiments, device 202 is configured to communicate with policy server 206. In various embodiments, policy server 206 is configured to communicate with document management system 208. In various embodiments, document management system 208 is configured to communicate with printer 210.

While device 202 is shown in the example to be a laptop computer, device 202 can also be a desktop computer, a tablet device, a smartphone, a mobile device, and/or other computing device.

Policy server 206 comprises an insurance policy management system. In some embodiments, policy server 206 is configured to provide configuration of insurance product models. In some embodiments, policy server 206 is configured to provide configuration of insurance product models via a user interface that is accessible via device 202, for example. In some embodiments, policy server 206 is configured to provide, at a user interface (e.g., for a user such as an insurance agent) a product model with a set of default insurance product definition templates that are customizable/editable by the insurance carrier to match up with the insurance policies they actually or plan to offer to their customers. The user can then add new insurance product definition templates, edit existing insurance product definition templates, and delete existing insurance product definition templates over time as the insurance carrier changes the terms of their insurance policies. In various embodiments, policy server 206 is configured to store the product models customized/edited by users (e.g., in a database).

In some embodiments, policy server 206 is configured to provide configuration of inference logic for various insurance policy forms. In some embodiments, policy server 206 is configured to provide the configuration of inference logic for insurance policy forms at a user interface that is accessible via device 202, for example. In some embodiments, policy server 206 can receive a selection of a particular insurance policy form from a user for which a set of inference logic is to be configured. Then for the selected insurance policy form, policy server 206 can present selections associated with configuring a set of inference logic at a user interface. For example, the selections associated with configuring a set of inference logic can, optionally, include one or more types of available policy lines. The selections can also include one or more types of inference rules. Upon receiving a selection of a particular type of inference rule or selections of a policy line and a particular type of inference rule, policy server 206 can provide selections corresponding to the selected type of inference rule or the subset of the selections corresponding to the selected type of inference rule and are associated with the selected policy line. The available policy lines and selections corresponding to the selected type of inference rule can include, for example, insurance product definition templates derived from one or more product models stored by policy server 206, identifiers associated with product models stored by policy server 206, and/or other configured values. In various embodiments, an inference rule type comprises a type of condition and selections corresponding to the inference rule type comprise specific conditions of that type (if more than one such specific conditions exist) such that if a certain policy instance meets/matches the specific condition under that type, then the insurance policy form is to be inferred (i.e., to be included in printing). In some embodiments, each type of inference rule and the selections corresponding thereof can be part of default settings configured for policy server 206 or can be configured/customized by a user and stored with policy server 206. The user can then select at least one selection corresponding to the selected type of inference rule. Then, the inference logic including at least the mapping between the selected inference rule type and the selected corresponding selection thereof can be stored for the insurance policy form. Where a policy line has been selected, the mapping additionally includes the selected policy line. In some embodiments, policy server 206 is configured to store copies of the insurance policy forms and also the user configured inference logic for each insurance policy form. In some embodiments, policy server 206 does not necessarily store the copies of the insurance policy forms but stores the user configured inference logic for each insurance policy form. In some embodiments, when policy server 206 does not store the copies of the insurance policy forms, they can be stored at a database and/or repository such as document management system 208.

In some embodiments, policy server 206 is configured to provide insurance policy form inference for policy instances at one or more configured events. In some embodiments, a configured event can be related to a life cycle transaction of a policy instance, such as, for example, when a policy instance is created for the first time. The configured events associated with various policy instances are stored by policy server 206. In various embodiments, at the occurrence of a configured event associated with a policy instance, policy server 206 is configured to apply the various sets of stored inference logic by comparing at least a portion of the policy instance to the inference logic stored for each insurance policy form. In the event that there is a match between the at least portion of the policy instance with the inference logic stored for a particular insurance policy form, then that insurance policy form is determined to be inferred for the policy instance and is marked to be printed for that policy instance. In some embodiments, policy server 206 is configured to send identifiers corresponding to the one or more inferred insurance policy forms to document management system 208 (where they are stored), which in turn sends copies of such forms to printer 210 to be printed. In some embodiments, printer 210 is configured to generate physical prints (e.g., onto paper) of the inferred forms and in some embodiments, printer 210 is configured to generate digital copies (e.g., files in PDF or other appropriate formats) of the inferred forms to be sent to the policy holder. In some embodiments, the inferred forms are printed to be populated with at least some information associated with the policy holder and/or policy instance.

Figure 3:
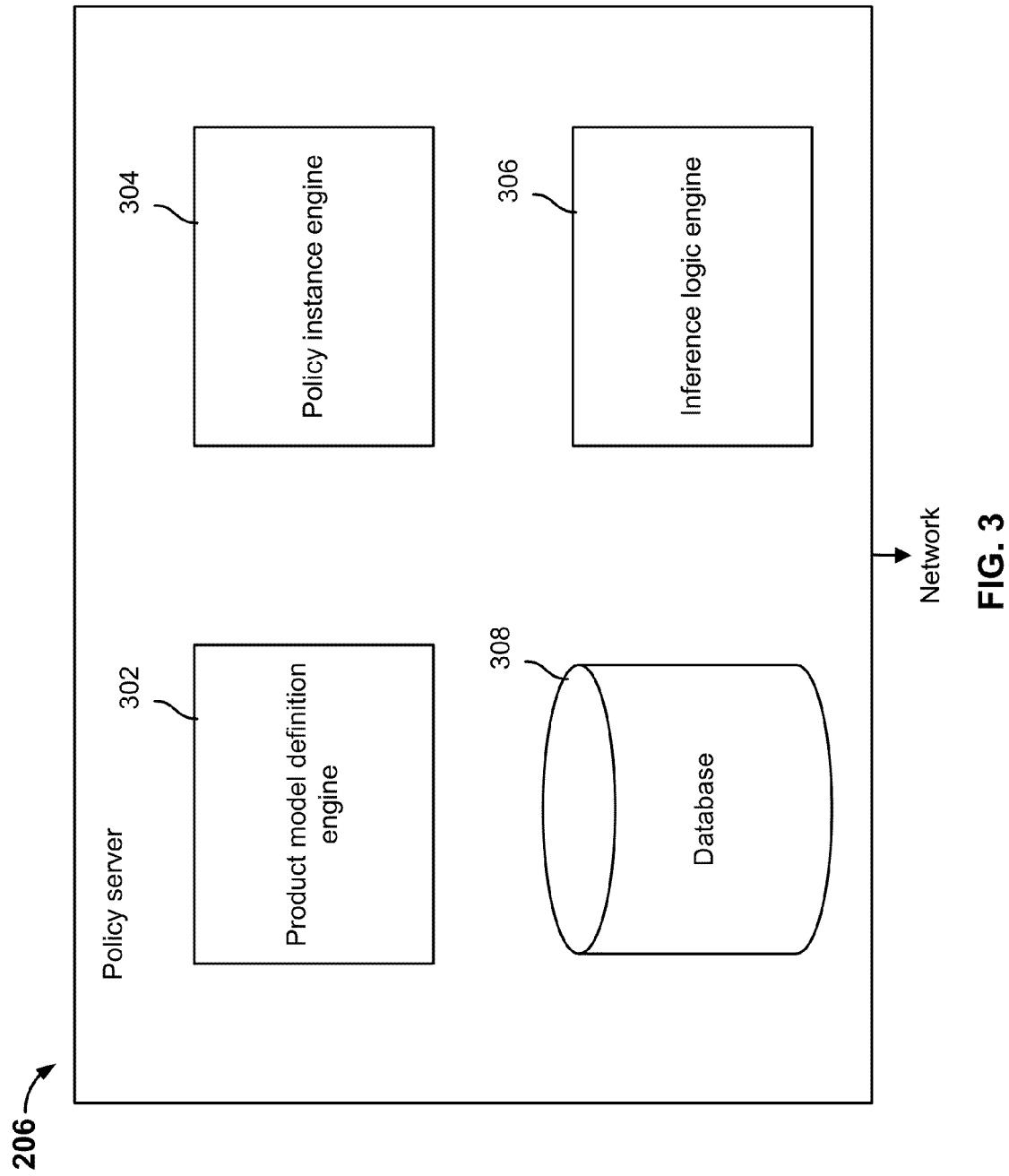
FIG. 3 is a diagram showing an embodiment of a policy server.

FIG. 3 is a diagram showing an embodiment of a policy server. In some embodiments, policy server 206 of system 200 is implemented with the example of FIG. 3. In the example, policy server 206 includes product model definition engine 302, policy instance engine 304, inference logic engine 306, and database 308. Each of product model definition engine 302, policy instance engine 304, and inference logic engine 306 can be implemented using software, hardware, or a combination.

Product model definition engine 302 is configured to provide a user interface at which a user can configure the insurance product definition templates of a product model, which is then stored.

Policy instance engine 304 is configured to provide a user interface at which a user can write a policy instance for an insurance customer using a product model. For example, writing the policy instance can include selecting a subset of insurance product definition templates from all the ones allowable/available from a product model and/or adding values corresponding to the selected insurance product definition templates. The policy instances are stored by policy instance engine 304 (e.g., at database 308).

Inference logic engine 306 is configured to provide a user interface at which a user can configure a set of inference logic to be associated with a particular insurance policy form. In some embodiments, a set of inference logic includes at least one user selected inference rule type and a user selected selection corresponding to that inference rule type, if any are available, corresponding to that inference rule type. In some embodiments, a set of inference logic includes, in addition to the user selected inference rule type and a user selected selection corresponding to that inference rule type, a selected policy line. For example, a set of inference logic can be stored as one or more files (e.g., XML files) and/or program code (e.g. GOSU code). In some embodiments, inference logic engine 306 is configured to present, at the user interface, a plurality of inference rule types and in some embodiments, also, a plurality of policy line types. For example, each such inference rule type can entail zero or more further selections within the category of selections associated with the inference rule type. Upon a user selection of an inference rule type or a user selection of an inference rule type and a type of policy line, inference logic engine 306 is configured to present the further selections associated with the selected inference rule type or the further selections associated with the selected inference rule type and also with the selected type of policy line. For example, if the selected inference rule type were associated with a coverage and no particular type of policy line was selected, then the further selections presented at the user interface could include insurance product definition templates of all specific coverages that are included in the one or more product models. Also, for example, if the selected inference rule type were associated with a coverage and the selected type of policy line were personal auto, then the further selections presented at the user interface could include insurance product definition templates of only specific coverages under the personal auto line that are included in the one or more product models stored at database 308. Then, the mapping among the selected policy line (if one is selected), selected inference rule type, and the selected selection corresponding to that inference rule type and policy line type are stored as part of the set of inference logic associated with the insurance policy form.

In some embodiments, database 308 stores a copy of each of the insurance policy forms for which a set of inference logic is configured. In some embodiments, database 308 does not necessarily store a copy of each insurance policy form but stores the set of inference logic configured for each insurance policy form. In that event, a set of inference logic can be stored with an identifier associated with the corresponding insurance policy form (e.g., name of the form).

Inference logic engine 306 is also configured to provide insurance policy form inference for policyholders at one or more configured events using the stored sets of inference logic. In some embodiments, one or more events that trigger the automatic performance of an insurance policy forms inference determination are configured. For example, one such event can be related to the life cycle transaction of a policy instance (e.g., at the creation of a new policy instance or at the midterm of an existing policy instance) or with respect to a modification of a policy instance and/or the product model on which it was based (e.g., the election by a policyholder for a new coverage added to the product model by the insurance carrier). In some embodiments, inference logic engine 306 is configured to first determine that an event that is configured to trigger an insurance policy forms inference determination has occurred with respect to a particular policy instance, and then compare at least a portion of the particular policy instance to the stored sets of inference logic configured for the various insurance policy forms. If the at least portion of the policy instance is determined to match a set of inference logic associated with a particular insurance policy form, then that insurance policy form is determined to be inferred for that policy instance.

In a specific example, assume that the personal auto policy line, the inference rule type associated with requiring a certain coverage to be included in a policy instance, and a selected specific coverage of medical payment from the personal auto policy line are configured as the inference logic that would result in form XYZ being inferred for a policy instance. Then later during an insurance policy forms inference determination (e.g., at the occurrence of a configured event such as issuing a new policy), form XYZ would be inferred for a policy instance that includes the elected coverage of medical payment under a personal auto policy line.

In some embodiments, after an insurance policy forms inference determination has been performed, at the occurrence of a configurable event associated with updating insurance policy forms previously inferred for a policy instance (e.g., when a policy is renewed or changed or at a midterm of a policy instance's effective coverage period), it is determined whether any of those forms need to be updated and printed again for the policy holder associated with the policy instance. In some embodiments, one or more insurance product definition templates and/or other values that are potentially included in the policy instance are configured to be monitored for an insurance policy form such that if they change since a previous inference determination, then the form is updated with the changed insurance product definition templates and/or other values. Such insurance product definition templates and/or other values to be monitored for change at a configurable event are, in some embodiments, stored as part of the inference logic associated with a particular insurance policy form.

Figure 4:
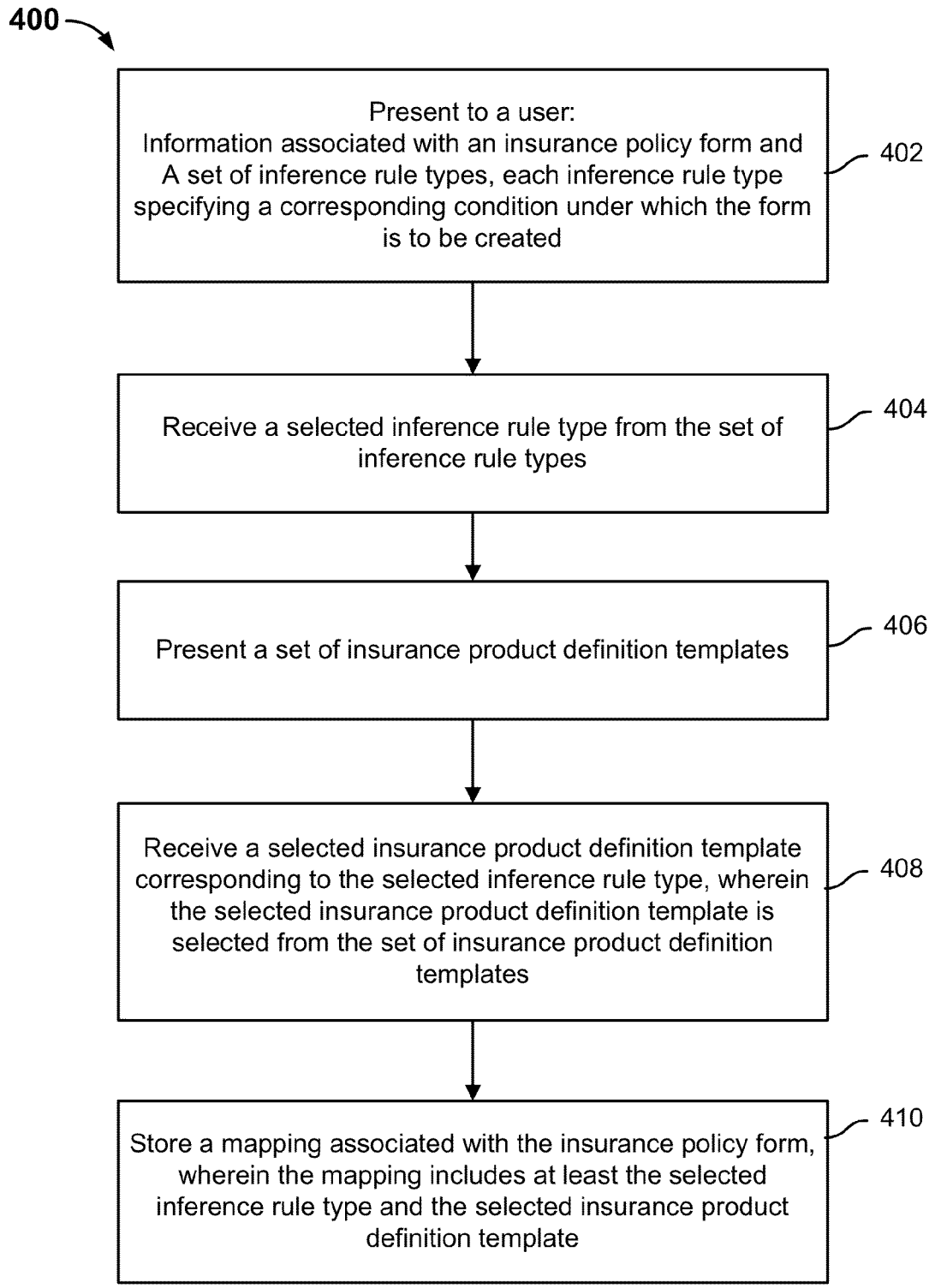
FIG. 4 is a flow diagram showing an embodiment of a process for providing configuration of inference logic for an insurance policy form.

FIG. 4 is a flow diagram showing an embodiment of a process for providing configuration of inference logic for an insurance policy form. In some embodiments, process 400 is implemented at system 200.

Process 400 can be used for configuring a set of inference logic for a particular insurance policy form. Prior to implementing process 400, an insurance policy form can be selected from a list of insurance policy forms that could be inferred for a policy instance and created for that policy instance. Process 400 can be repeated for each of the insurance policy forms.

At 402, information associated with an insurance policy form and a set of inference rule types, each inference rule type specifying a corresponding condition under which the form is to be created are presented to a user. In some embodiments, a user interface can be presented for the configuration by a user of a set of inference logic for a selected insurance policy form. In some embodiments, one or more types of inference rules can be presented such that a user can select one such inference rule type at a time. In some embodiments, each inference rule type comprises a type or category of conditions that a policy instance can meet or match. In some embodiments, to create an insurance policy form includes printing the form and in some embodiments, prepopulating the insurance policy form with at least some relevant values.

In some embodiments, a plurality of available types of policy lines is also presented. In some embodiments, the plurality of available types of policy lines comprises policy line insurance product definition templates pulled from one or more product models.

At 404, a selected inference rule type from the set of inference rule types is received. For example, a user can make a selection of the desired inference rule type.

Also for example, a user can make a selection of the desired policy line type.

At 406, a set of insurance product definition templates is presented. In response to the selection of an inference rule type, one or more selections, at least some of which correspond to the selected inference rule type are presented. In some embodiments, because each inference rule type comprises a type or category of conditions, each selection corresponding to the type is a specific condition under that type. In some embodiments, the one or more selections corresponding to the selected inference rule type comprise insurance product definition templates that are pulled/derived from one or more product models.

In some embodiments, if a type of policy line has been selected, then the selected type of policy line can act as an additional filter on the set of insurance product definition templates corresponding to the selected inference rule type that is presented. Put another way, if a type of policy line has been selected, then only those insurance product definition templates corresponding to the selected inference rule type that are also of the selected type of policy line are presented to the user. For example, if the selected inference rule type were associated with coverages and the selected policy line type were the personal auto policy line, then only those specific coverages associated with the personal auto policy line (e.g., medical payments coverage, towing and labor coverage, collision coverage, personal injury protection coverage, liability coverage) and not coverages associated with other policy lines (e.g., homeowner policy line) would be presented as insurance product definition templates corresponding to the selected inference rule type.

In various embodiments, corresponding relationships between one or more insurance product definition templates and a type of inference rule is predefined within default settings at the policy server. In various embodiments, corresponding relationships between one or more insurance product definition templates and a type of inference rule are configured by a user prior to implementing process 400.

At 408, a selected insurance product definition template corresponding to the selected inference rule type is received, the selected insurance product definition template being selected from the set of insurance product definition templates. For example, a user can make a selection of the desired insurance product definition template corresponding to the selected inference rule type. In some embodiments, more than one corresponding product definition templates corresponding to the selected inference rule type may be selected.

At 410, a mapping associated with the insurance policy form, wherein the mapping includes at least the selected inference rule type and the selected insurance product definition template is stored. The selections of the inference rule type and the corresponding insurance product definition are stored as a mapping to the insurance policy form such that when the insurance policy form inference is performed for a policy instance and the policy instance includes the selections of the inference rule type and the corresponding insurance product definition template stored in the mapping for the form, that form will be inferred for the policy instance. In some embodiments, if a type of policy line was selected, then the selected policy line is also included in the mapping for the form. The mapping can be stored with either a copy of the insurance policy form or an identifier thereof.

In some embodiments, more than one inference rule and corresponding insurance product definition templates thereof can be selected and stored with the mapping for the insurance policy form.

FIG. 5 is an example table that is used to store sets of configured inference logic for various insurance policy forms. In some embodiments, table 500 is stored at a policy server such as policy server 206 of system 200. The leftmost column includes identifiers of various insurance policy forms ("PP 0004," "SFG5H43," "63_AD427_FG," "GH2378KSS," and "4RRKS90"). The second column from the left includes identifiers of various policy lines ("Personal auto," "Homeowner," "Personal auto," "Personal auto," and "Homeowner"). The third column from the left includes identifiers associated with inference rule types ("Coverage term limit," "Exclusion," "Coverage," "Coverage," "Typelist value," and "No additional criteria") selected for the corresponding form using a process such as process 400. Details of the inference rule types are discussed below. The rightmost column includes selected insurance product definition templates corresponding to the selected inference rule type. In practice, the types of policy lines, the types of inference rules, the insurance product definition templates, and their correspondence thereof are not limited to those shown in the example.

In the table, the policy line, the one or more inference rule types and their respective insurance product definition templates associated with the identifier of a form can be referred to as a mapping for the form. As shown in the example, the mapping for form "PP 0004" includes the policy line of "Personal auto," the inference rule type of "Coverage Term Limit" and the corresponding insurance product definition templates of coverage: "Towing and Labor" and coverage term limit value: "$100." The "Coverage Term Limit" rule type requires for a policy instance to include a specific coverage term limit to a specific coverage so that the associated insurance policy form would be inferred for that policy instance. As illustrated by the mapping for form "PP 0004," for a selected inference rule type, more than one insurance product definition templates corresponding to that inference rule type and associated with the selected policy line can be selected. For form "PP 0004," under the inference rule type of "Coverage Term Limit," the specific coverage of "Towing and Labor" is selected but so is a "$100" coverage term limit value on the "Towing and Labor" coverages, meaning that for form "PP 0004" to be inferred for a policy instance, the policy instance needs to include Towing and Labor coverage with an associated coverage term limit of $100. For example, form "PP 0004" will not be inferred for a policy instance that includes Towing and Labor coverage but with an associated coverage term limit other than $100 (e.g., the form will not be inferred for a policy instance with Towing and Labor limit of $50).

As shown in the example, the mapping for the form "SFG5H43" includes the selected policy line of "Homeowner," the inference rule type of "Exclusion" and the corresponding insurance product definition template of Peril value: "Fire and Lightning." The "Exclusion" rule type requires that for a policy instance to include a specific exclusion so that the associated insurance policy form would be inferred for that policy instance. So form "SFG5H43" would be inferred for a policy instance that includes the exclusion of a peril value that is "Fire and Lightning."

As shown in the example, the mapping for the form "63_AD427_FG" includes the selected policy line of "Personal auto," the inference rule type of "Coverage" and the corresponding insurance product definition templates of coverage: "Medical payment." The "Coverage" rule type requires for a policy instance to include a specific coverage so that the associated insurance policy form would be inferred for that policy instance. So form "63_AD427_FG" would be inferred for a policy instance that includes the coverage of "Medical payment."

As shown in the example, the mapping for the form "GH2378KSS" includes the selected policy line of "Personal auto," a first inference rule type of "Coverage" and a corresponding insurance product definition template of coverage "Towing and Labor" and a second inference rule type of "Typelist Value" and corresponding insurance product definition templates of covered object: "personal vehicle," selected field: "body type," selected value: "pickup truck." The "Typelist value" rule type requires that for a policy instance to include one or more typelist values so that the associated insurance policy form would be inferred for that policy instance. As illustrated by the mapping for form "GH2378KSS," more than one inference rule types can be selected for a form, which means that for form "GH2378KSS" to be inferred for a policy instance, the policy instance needs to include either Towing and Labor coverage or a covered object of a personal vehicle that is associated with a body type of a pickup truck. For example, form "GH2378KSS" will be inferred for a policy instance that includes one of Towing and Labor coverage or a covered object of a personal vehicle that is associated with a body type of a pickup truck.

As shown in the example, the mapping for form "4RRKS90" includes the selected policy line of "Homeowner," the inference rule type of "No additional criteria," and no corresponding insurance product definition template because the inference rule type of "No additional criteria" does not specify any insurance product definition template. As a result of having the inference rule type of "No additional criteria," form "4RRKS90" can be inferred for any policy instance that is effective at the time of performing inference and/or matches attributes other than inference rule type and corresponding insurance product definition templates, such as insurance product, insurance policy regulatory jurisdiction, and insurance policy effective date (not shown in FIG. 5) of form "4RRKS90." FIGS. 6-7 illustrate an example of configuring an insurance product definition template for a product model.

Figure 6A:
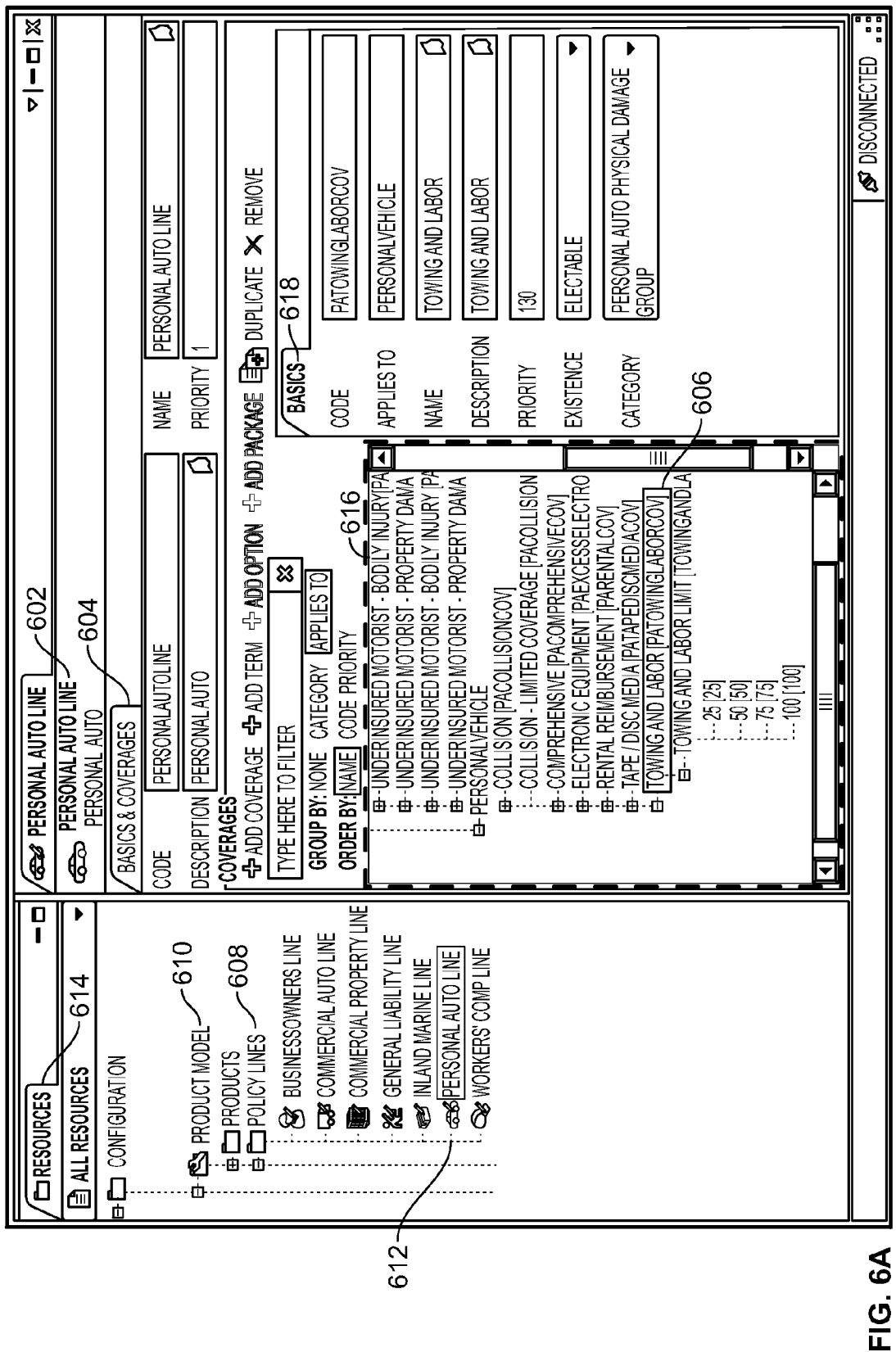
FIG. 6A shows an example of a user interface for configuring a product model.
Figure 7:
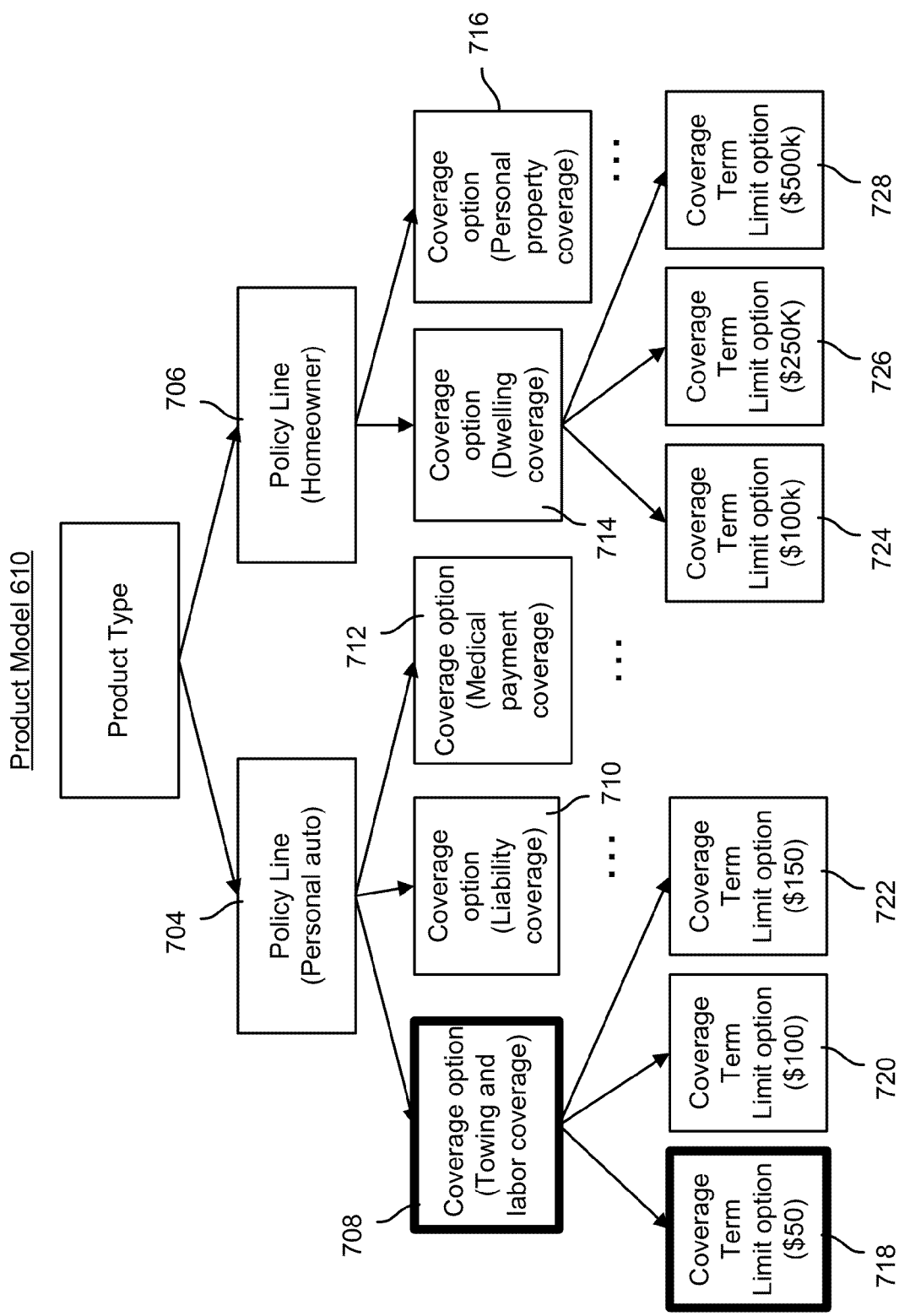
FIG. 7 is an example of a representation of product model 610.

FIG. 6A shows an example of a user interface for configuring a product model. The user interface can be provided by a policy server such policy server 206 of system 200, as a standalone program, a browser enabled program, etc. A user can use the user interface to edit the insurance product definition templates that help define an insurance policy represented by the product model. As shown in the left hand section titled Resources 614, editing/customization is currently being configured (e.g., by a user associated with an insurance carrier) for Product model 610 and specifically to Personal Auto Line 612, which is selected among Policy Lines 608. The right hand section titled Personal Auto Line 602 is shown in response to the selection of Personal Auto Line 612. Among the configurable elements under Personal Auto Line 602, Basics & Coverages tab 604 is selected. Then, among the coverages presented in area 616, Towing and Labor coverage 606 is selected to be added as a configured insurance product definition of product model 610. Below selected Towing and Labor coverage 606 are some expanded options associated with that coverage, such as a Towing and Labor coverage limit and various limit values. Some configurable and some non-configurable information associated with selected Towing and Labor coverage 606 is shown under basics tab 618.

Figure 6B:
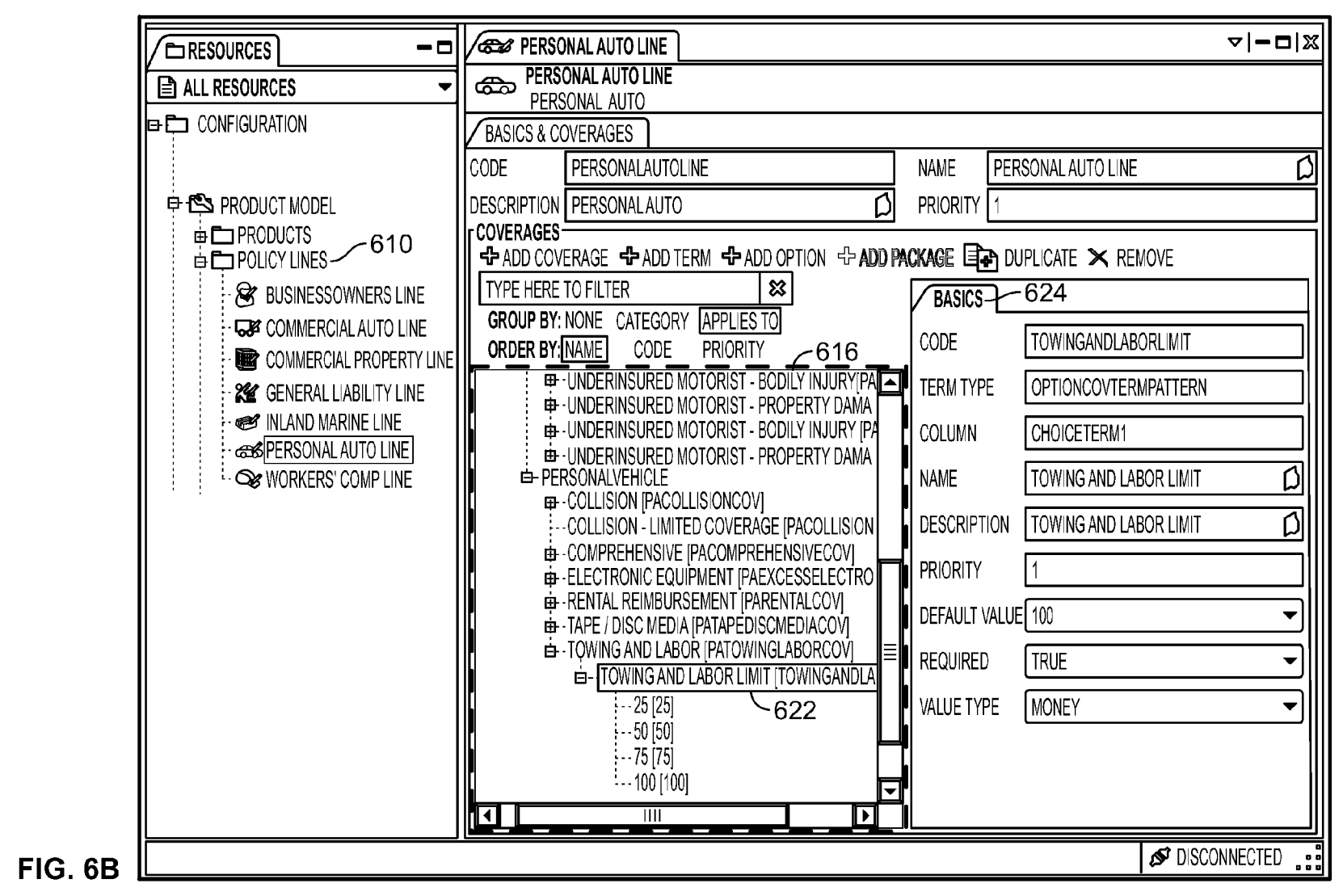

FIG. 6B shows an example of a user interface for configuring a product model. The user interface of FIG. 6B is the same as the one of FIG. 6A, except that now in area 616, Towing and Labor Limit 622 has been selected as a insurance product definition template to be associated with Towing and Labor coverage 606 insurance product definition template of product model 610. Some configurable and some non-configurable information associated with selected Towing and Labor Limit 622 is shown under basics tab 624. As shown under basics tab 624, the Default Value for Towing and Labor Limit 622 is 100.

Figure 6C:
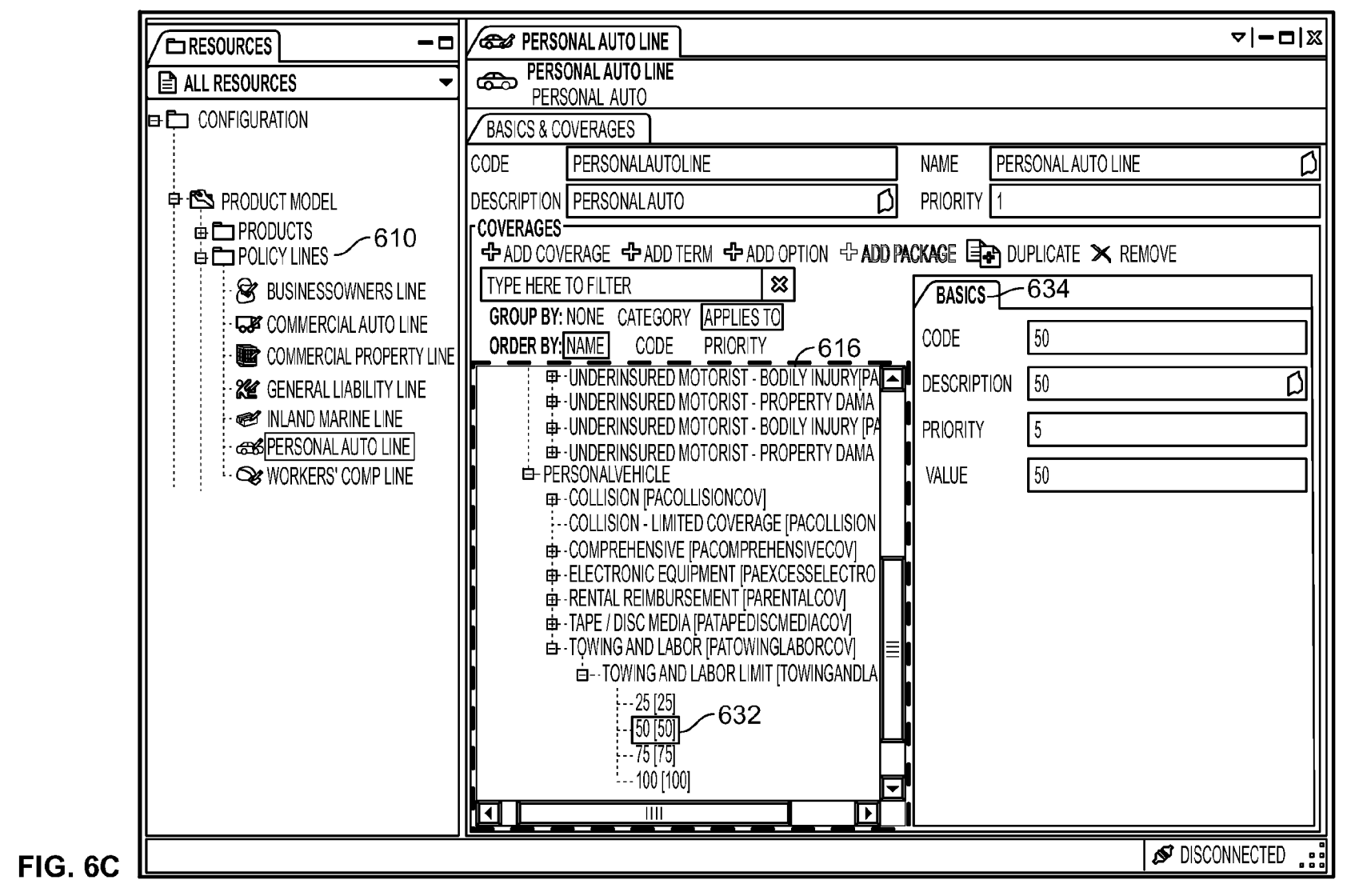

FIG. 6C shows an example of a user interface for configuring a product model. The user interface of FIG. 6C is the same as the one of FIG. 6A and FIG. 6B, except that now in area 616, the value 50 632 has been selected as an insurance product definition template to be associated with Towing and Labor Limit 622 insurance product definition template and Towing and Labor coverage 606 insurance product definition template of product model 610. Some configurable and some non-configurable information associated with selected Towing and Labor Limit value 50 632 is shown under basics tab 634.

As a result of the selections made at the user interfaces of FIGS. 6A, 6B, and 6C, insurance product definition templates of a Towing and Labor coverage with a coverage limit of 50 was added to product model 610. The following is an example showing the added insurance product definition templates in a representation of product model 610.

FIG. 7 is an example of a representation of product model 610. In some embodiments, product model 610 can be stored as one or more data structures, a set of metadata, and/or program code at a policy server such as policy server 206 of system 200. As shown in the example, product model 610 includes insurance product definition templates 704-728. In the example, the insurance product definition templates for product model 610 are arranged in a tree-type of structure. At least some of the insurance product definition templates could be configured at a user interface such as FIGS. 6A, 6B, and 6C to be included in product model 610 by a vendor associated with the policy server and/or a representative of an insurance carrier. Product model 610 includes at least policy lines of Personal Auto 704 and Homeowner 706. Under each policy line are some coverages configured to be under that policy line. Under homeowner policy line 706, there are coverage options of Dwelling coverage 714 and Personal Property coverage 716. For Dwelling coverage 714, there are coverage term limit options including $100K 724, $250K 726, and $500K 728. Coverage term limit options can exist for the coverage option of Personal Property coverage 716 but they are not shown in the example. Under policy line Personal Auto 704, there are the coverage options of Towing and labor 708, Liability 710, and Medical Payment coverage 712. For Towing and labor coverage option 708, there are coverage term limit options including $50, $100, and $150. Coverage term limit options can exist for the coverage options of Liability 710 and Medical payment 712 but they are not shown in the example.

By virtue of the selections made at the user interfaces of FIGS. 6A, 6B, and 6C, coverage option Towing and labor 708 and its associated coverage term limit of $50 718 were added to product model 610.

As will be described below, a policy instance based on a product model is written by at least in part selecting some of insurance product definition templates 704-728 based on the information provided by an insurance customer.

FIGS. 8-12 illustrate examples of selecting of a particular insurance policy form and configuring at least a portion of a set of inference logic for the form. For example, the user interfaces of FIGS. 8-12 can be used by an insurance carrier's agent that is responsible for configuring inference logic for various insurance policy forms. Such an agent can have an administrator capacity and may not need to know how to write computer program code as selections for the configuration can be made at the user interfaces.

FIG. 8 shows an example of a user interface for selecting a particular insurance policy form. The user interface can be provided by a policy server such as policy server 206 of system 200. As shown in the example, in area 802, there is a list of insurance policy forms, where each row comprises a form. Each form is associated with attributes such a code, a number, an edition, a name, and a group code, if one is applicable. While the policy server may not necessarily store copies of such forms, the policy server can store such attributes associated with each form, of which a copy may be stored elsewhere (e.g., at a document management system such as document management system 208 of system 200). One form may be selected from the list at a time and a set of inference logic be configured for the form. In this example, the form associated with code "PP__0004," Number: "PP 0004," Edition: "0100," and Name: "Towing and Labor Costs Coverage" at row 804 is selected so that a set of inference logic can be configured for it.

FIG. 9 shows an example of a user interface that includes information associated with a selected insurance policy form. The example of FIG. 9 is presented in response to the selection of the "Form Pattern: PP 0004-0100 [PP__0004]" ("Towing and Labor Costs Coverage") form at row 804. In the example, some identifying information associated with the selected form is shown in area 902 of the user interface. Below area 902 are various tabs of information associated with the selected "Form Pattern: PP 0004-0100 [PP__0004]" form. In the example, basics tab 904 is selected and so information under the basics category is presented. Other information and/or attributes of the selected "Form Pattern: PP 0004-0100 [PP__0004]" form can be seen if one of products tab 908, jobs tab 910, or jurisdictions tab 912 is selected. To start configuring a set of inference logic for the selected "Form Pattern: PP 0004-0100 [PP__0004]" form, inference tab 906 is to be selected.

FIG. 10 shows an example of a user interface that includes inference logic configuration for a selected form. The example of FIG. 10 is presented in response to the selection of inference 906 at the user interface of FIG. 9. At area 1012, there is a statement that reads "Forms are only inferred when Product, Job, and Jurisdiction criteria also match," which indicates that in addition to a policy instance needing to match the inference logic to be configured below at fields 1004, 1002, 1006, 1008, 1010, and 1014, the policy instance also needs to match the Product, Job, and Jurisdiction criteria of the selected "Form Pattern: PP 004-0100 [PP__0004]" form at the time forms inference is performed in order for "Form Pattern: PP 004-0100 [PP__0004]" form to be inferred for that policy instance. The Product, Job, and Jurisdiction criteria of the selected "Form Pattern: PP 0004-0100 [PP__0004]" form can be viewed and/or configured at products tab 908, jobs tab 910, or jurisdictions tab 912 as shown in FIG. 9 and will not be further discussed.

At policy line field 1004, a user can select an available type of policy line (as indicated in the one or more product models associated with the user interface) from policy line dropdown menu 1002. In this example, the policy line selected at policy line dropdown menu 1002 is "Personal Auto Line." At form inference conditions field 1006, a user can select a type of inference rule from inference rule types dropdown menu 1008. In this example, the inference rule type selected at the inference rule types dropdown menu 1008 is "Selected coverage, condition, or exclusion is used." "Selected coverage, condition, or exclusion is used" is an example of a type of inference rule that is associated with a condition that requires that a policy instance must include one of a specific coverage, a specific condition, or a specific exclusion so that the form will be inferred for the policy instance. Such a specific coverage, a specific condition, or a specific exclusion is to be specified at selection area 1010 that corresponds to coverage, condition, or exclusion field 1014 by selecting icon 1016.

FIG. 11 shows an example of a user interface that includes a list of coverages associated with inference logic configuration for a selected form. The example of FIG. 11 is presented in response to the selection of icon 1016 near the selection area 1010 that corresponds to coverage, condition, or exclusion field 1014 at the user interface of FIG. 10. At type field 1102, of the three radio buttons for condition, coverage, or exclusion, respectively, the coverage radio button has been selected to indicate that a specific coverage will be selected to correspond to the inference rule type of "Selected coverage, condition, or exclusion is used." In various embodiments, for whichever one of condition, coverage, or exclusion is selected at type field 1102, list 1104 will be populated with corresponding insurance product definition templates pulled from the one or more product models associated with the user interface. In this example, because coverage was selected at type field 1102, list 1104 is populated with rows of insurance product definition templates of specific coverages pulled from one or more product models. To specify "Towing and Labor" coverage from list 1104, select button 1114 is to be selected.

FIG. 12 shows an example of a user interface that includes inference logic configuration for a selected form. The example of FIG. 12 is presented in response to the selection of select button 1114 associated with "Towing and Labor" at the user interface of FIG. 11. As shown in the example, because select button 1114 associated with "Towing and Labor" was selected in FIG. 11, the specific coverage of "Towing and Labor" now appears in selection area 1202. So, a mapping included in a set of inference logic to be stored for "Form Pattern: PP 004-0100 [PP_0004]" form includes the policy line of personal auto, the interference rule type of a selected coverage, and the specific coverage of "Towing and Labor." So when insurance policy form inference is performed for a policy instance for a first time, if the policy instance includes "Towing and Labor" coverage under the personal auto line then "Form Pattern: PP 004-0100 [PP_0004]" form will be inferred and printed for that policy instance.

In the example of FIG. 12, starting from area 1204 and below are configurable parameters associated with updating the "Form Pattern: PP 004-0100 [PP_0004]" form for a policy instance for which the "Form Pattern: PP 004-0100 [PP_0004]" form had previously been inferred, if certain insurance product definitions of the policy instance change by the occurrence of a configured update event. Sometimes, a particular insurance policy form is inferred for a policy instance based on the insurance product definition templates (pulled from one or more product models) and/or other values that are included in the policy instance at the time of performing that inference determination (e.g., the creation of the policy instance). However, by a later time, some of the insurance product definition templates and/or other values may have changed (e.g., due to the election of the policyholder or the insurance carrier) from what they were at the time of the previous inference determination. So, if inference were to be performed for the user again at this later time, then an updated insurance policy form that includes the updated insurance product definition templates and/or other values may need to be printed for the policy instance (or policyholder thereof). For example, a policyholder may elect a different coverage limit midway through the effective coverage period of the policy instance. The insurance product definition templates and/or other values configured to be monitored for whether they have changed at the midterm in this example include coverage term limit "Towing and Labor Limit" 1206 and covered object fields BasisAmount 1208 and LicensePlate 1210. If the "Form Pattern: PP 004-0100 [PP_0004]" form was inferred for a policy instance at a previous inference determination (e.g., when the policy instance was created), then at a later date during the effective coverage period of the policy instance, it is determined whether if any of coverage term limit "Towing and Labor Limit" 1206 and covered object fields BasisAmount 1208 and LicensePlate 1210 that may be included in the policy instance has changed. If so, then the "Form Pattern: PP 004-0100 [PP_0004]" form is updated with the changed values and also printed again for that policy instance. The values that are to be monitored for changed values can be stored with the inference logic (e.g., mapping among the selected policy line, inference rule type, and corresponding insurance product definition template) configured for the form.

Figure 13:
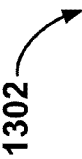
FIG. 13 is an example of an entry of a table that is used to store sets of configured inference logic for the selected form.

FIG. 13 is an example of an entry of a table that is used to store sets of configured inference logic for the selected form. The entry is used to show an example of how information configured for a set of inference logic for selected form "PP 0004" (which is also referred as the "Form Pattern: PP 004-0100 [PP_0004]" form) with the user interface examples of FIGS. 8-12 can be stored. The form "PP 0004" for which inference logic was to be configured was selected via the user interface of FIG. 8. The "Personal Auto" policy line was selected via the user interface of FIG. 10. The "Coverage" type of inference rule was selected via the user interface of FIG. 10. The "Towing and Labor" coverage was selected via the user interfaces of FIGS. 11-12. Unlike the table of FIG. 5, the table in this example includes the additional column of midterm update values, which indicate the values of the form that are to be potentially updated midway through a policy instance's effective coverage period (i.e., any time after the start of the policy term). In the example, the coverage term limit "Towing and Labor Limit" and Covered Object Fields BasisAmount or LicensePlate were configured at the user interface of FIG. 12. In some embodiments, no midterm update values are configured for a particular insurance policy form.

To apply inference on a policy instance using the entry of the example, if the policy instance includes "Towing and Labor" coverage under the personal auto line, then form "PP 0004" would be inferred and printed for the policy instance. Then, if the inference logic is executed again midway through the policy instance's effective coverage period, such as, for example, because the policyholder elected a different coverage limit value, if the policy instance included any of "Towing and Labor Limit" and Covered Object Fields BasisAmount or LicensePlate and at least one of them has changed, then form "PP 0004" would be updated with the changed values and printed again for the policy instance.

FIG. 14 shows an example of a user interface that includes inference logic configuration for a selected form. The example of FIG. 14 shows the configuration of another inference rule type and corresponding insurance product definition templates for the "Form Pattern: PP 004-0100 [PP_0004]" form. At form inference conditions field 1402, a user can select another type of inference rule from inference rule types dropdown menu 1404. In this example, the inference rule type selected at the inference rule types dropdown menu 1404 is "Selected typelist value is chosen." "Selected typelist value is chosen" is an example of a type of inference rule that is associated with a condition that requires that a policy instance must include one or more specific typelist values so that the form will be inferred for the policy instance. Such specific typelist values can be selected from the dropdown menus 1410, 1412, and 1414 for respective fields of covered object 1404, selected field 1406, and selected value 1408. In the example, "Personal vehicle" is selected from dropdown menu 1410 corresponding to Covered Object 1404, "Body-Type" is selected from dropdown menu 1412 corresponding to Selected Field 1406, and "Pickup Truck" is selected form the dropdown menu 1414 corresponding to Selected Value 1408. In some embodiments, value selections presented for the "Selected typelist is chosen" type of inference rule are pulled from a data model and correspond directly to the metadata defining policy instances (e.g., which are stored in the database 308).

FIG. 15 is an example of an entry of a table that is used to store sets of configured inference logic for the selected form. The entry is used to show an example of how information configured for a set of inference logic for selected form "PP 0004" with the user interface can include more than one selected inference rule types and corresponding insurance product definition templates. The entry is the same from FIG. 13 except with the new addition in the highlighted area of 1504 that include the "Typelist value" inference rule type and the corresponding Covered object: "Personal vehicle"; Selected Field: "BodyType"; Selected Value: "Pickup truck" insurance product definition templates. In applying the inference logic of the example, so long as a policy instance matches one selected inference rule type and its corresponding instance product definition template(s), then form "PP 0004" will be inferred for the policy instance.

Some other examples of other inference rule types ("Form inference conditions") that can be presented at a user interface associated with the policy server other than "Selected coverage, condition, or exclusion is used" and "Selected typelist value is chosen" as described above, include:

"No additional criteria": This type of inference rule indicates that there will be no insurance product definition templates selected and the form will be inferred for a policy instance so long as long the selected policy line the form and other attributes such as, for example, insurance product, insurance policy regulatory jurisdiction, and insurance policy effective date of the form match those corresponding attributes of the policy instance.

"Selected coverage term value": This type of inference rule is associated with a condition that requires that a policy instance must include a coverage term, such as a limit or deductible, of a selected value associated with a selected coverage. Various coverage terms that are associated with the selected coverage can be pulled from the one or more product models, in some embodiments.

"An associated form is invalidated": This type of inference rule is associated with the condition that the current insurance policy form is designated to be associated with another insurance policy form such that if the other form is inferred for a policy instance but is later invalidated, then the current form is inferred for the policy instance to inform the policyholder of the policy instance to ignore the contents of the invalidated form that had previously been included.

"An associated form is invalidated or updated": This type of inference rule is associated with the condition that the current insurance policy form is designated to be associated with another insurance policy form such that if the other form is inferred for a policy instance but is later changed at least in part, or invalidated, then the current form is inferred for the policy instance to inform the policyholder of the policy instance to ignore the contents of the previous version of the form before it was changed or invalidated. A new, updated form with the changed content may be inferred for the policy instance.

In some embodiments, the inference rule types ("Forms inference conditions") and their corresponding insurance product definition templates as mentioned above are predefined by a vendor associated with the policy server and the product models thereof. In some embodiments, an inference rule type and one or more corresponding insurance product definitions can be configured/customized at a user interface and/or using program code. For example, to configure such a customized inference rule type and one or more corresponding insurance product definition templates or other values, mapping and/or program code can be written in one or more files to indicate at least which insurance product definition templates or other values are to be mapped to a particular inference rule type, in which data source the insurance product definition templates or other values are located, and how the insurance product definition templates or other values are to be presented at a user interface. Once a customized inference rule type and its corresponding insurance product definition templates are configured, then they can be displayed at a user interface for configuring a set of inference logic for a form and selected.

FIGS. 16-19 are used to describe an example of how configured inference logic of insurance policy forms can be used to infer forms to be created for a policy instance. For example, the user interfaces of FIGS. 17 and 20 can be used by an insurance carrier agent that is responsible for creating insurance policies for insurance customers and also to determine which forms are needed by the customers.

Figure 16:
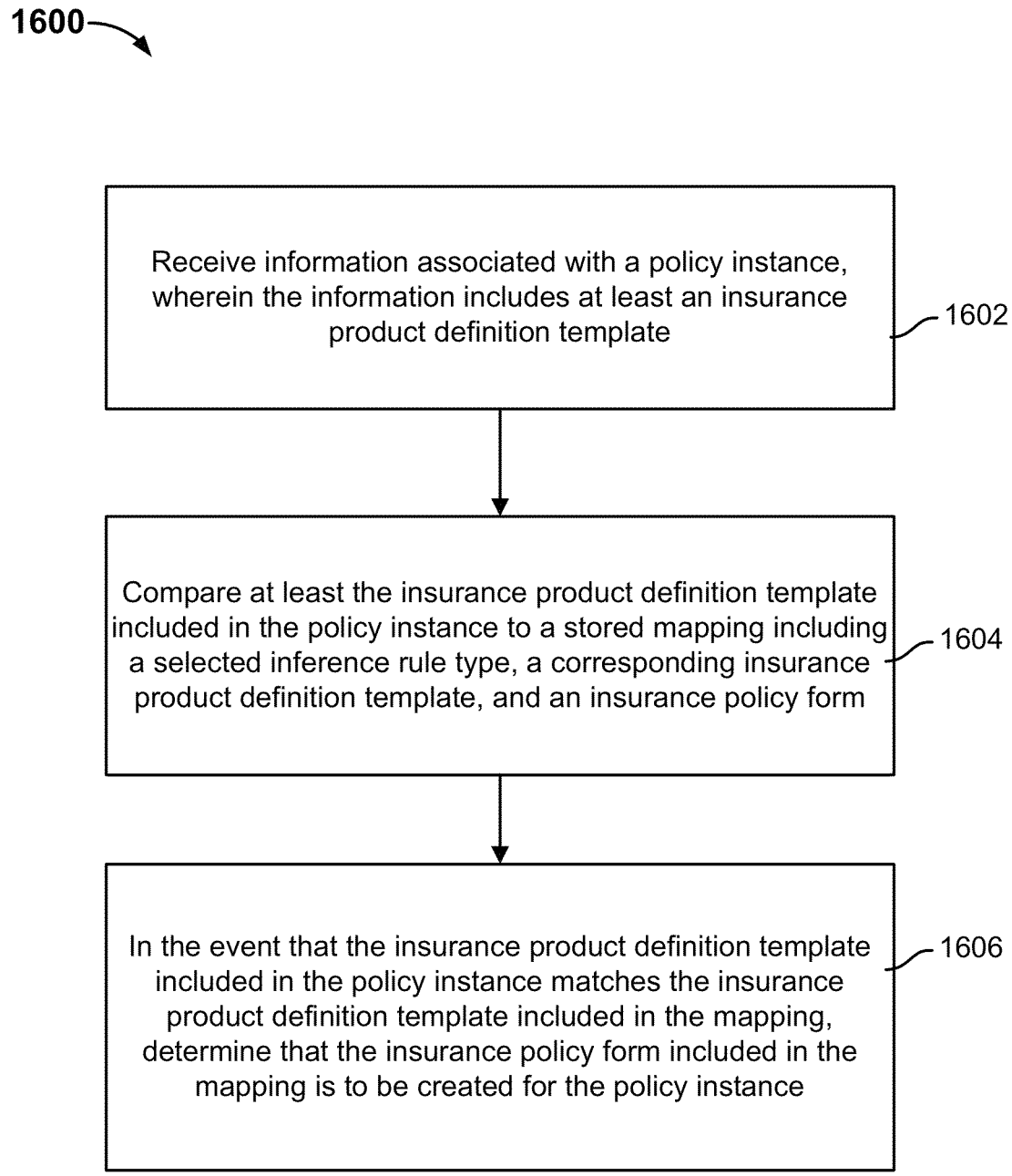
FIG. 16 is a flow diagram showing an embodiment of a process of inferring an insurance policy form.

FIG. 16 is a flow diagram showing an embodiment of a process of inferring an insurance policy form. In some embodiments, process 1600 is implemented at system 200.

In some embodiments, process 1600 is performed at the occurrence of an event configured for performing insurance policy forms inference for a policy instance. Examples of such an event is at the creation of the policy instance or after the determination of premium associated with the policy instance.

At 1602, information associated with a policy instance, wherein the information includes at least an insurance product definition template. In some embodiments, information associated with the insurance product definition templates selected to be in a policy instance written for a policyholder is received. The information associated with a policy instance can include, for example, elected coverages under one or more policy lines, respective coverage term limits, deductible, and exclusions that are included in the policy instance.

At 1604, at least the insurance product definition template included in the policy instance is compared to a stored mapping including a selected inference rule type, a corresponding insurance product definition template, and an insurance policy form. At least some of the insurance product definition templates included in the policy instance are compared to the stored sets of configured inference logic for various insurance policy forms, each including a mapping of a selected inference rule type, a corresponding insurance product definition template, and a particular insurance policy form.

At 1606, in the event that the insurance product definition template included in the policy instance matches the insurance product definition template included in the mapping, it is determined that the insurance policy form included in the mapping is to be created for the policy instance. For example, in the event that an insurance policy form is inferred and so determined to be created for the policy instance, a copy of the insurance policy form can either be physically printed onto paper or converted into a soft copy (e.g., into PDF format) and sent to the policyholder or other parties associated with the policy instance.

FIG. 17 shows an example of a user interface associated with writing a policy instance. In the example, the user interface presents various coverages that are insurance product definition templates included in a product model on which the policy instance is based. In writing the policy instance for insurance customer/policyholder Jimbo Jones, certain coverages from the personal auto policy line can be elected as desired by the Jimbo Jones. In this example, the Towing and Labor coverage has been selected at area 1702. At area 1704, a coverage term limit of 100 is selected for the policy instance.

Figure 18:
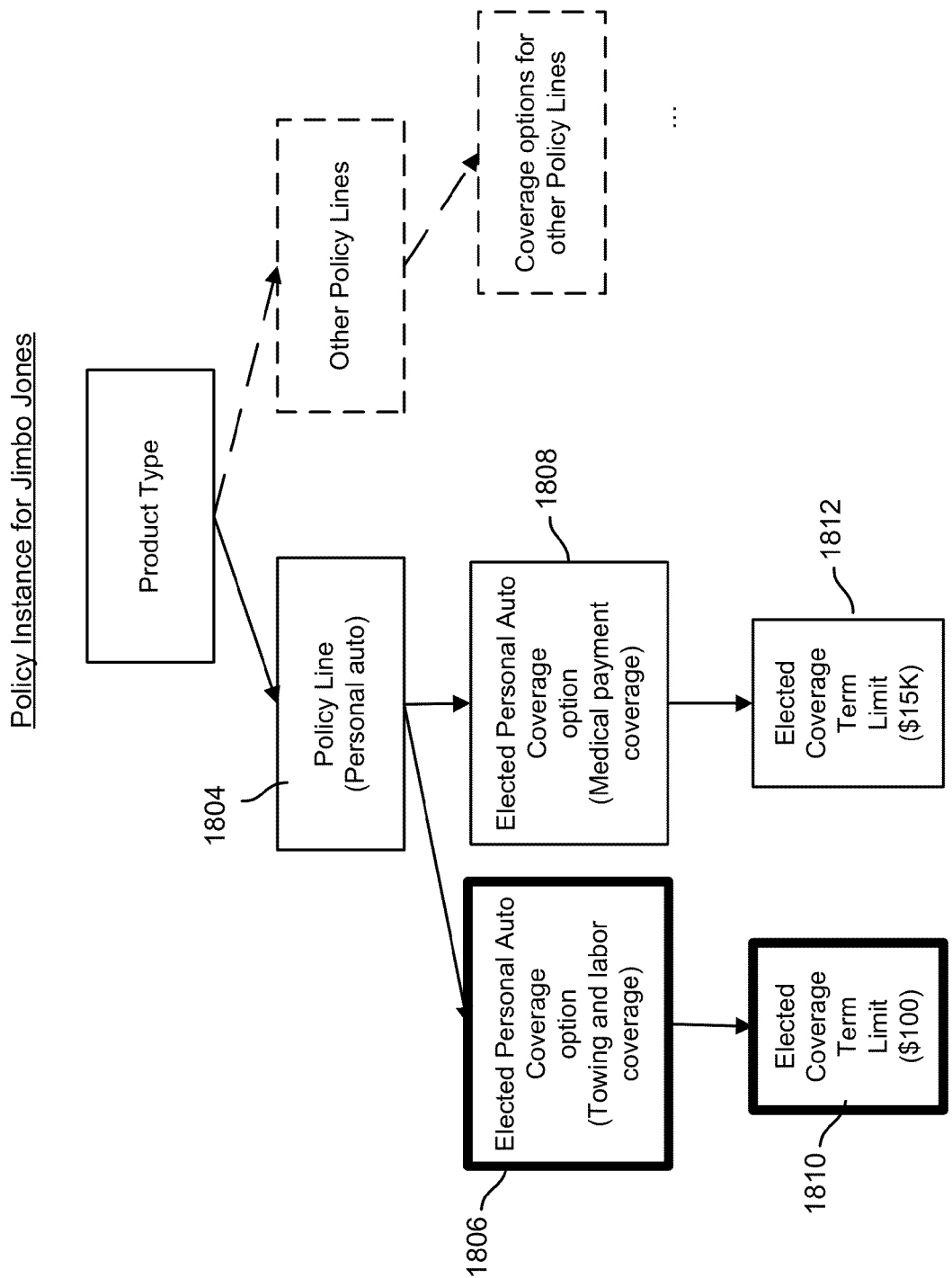
FIG. 18 is an example of a representation of a policy instance.

FIG. 18 is an example of a representation of a policy instance. The example of the policy instance is based on the product model of FIG. 7 and is written for policyholder Jimbo Jones. As shown in the example, the policy instance includes a subset of the insurance product definition templates included in the product model. The insurance product definition templates included in the policy instance includes those elected by Jimbo Jones. In the example, under Personal Auto policy line 1804, Jimbo has elected the coverages of Towing and Labor 1806 and Medical Payment 1808. For Towing and Labor coverage 1806, Jimbo had elected coverage term limit of $100 1810 and for Medical Payment coverage 1808, Jimbo had elected coverage term limit of $15K 1812. As a result of the selections made at the user interface of FIG. 17, the insurance product definition templates of Towing and Labor coverage 1806 and associated coverage term limit of $100 1810 were added to the policy instance for Jimbo.

FIG. 19 is an example of an entry of a table that is used to store sets of configured inference logic for the form "PP 0004." In the example, the mapping for form "PP 0004" includes the "Personal Auto" policy line, the "Coverage Term Limit" type of inference rule, the "Towing and Labor" coverage and corresponding coverage term limit of "100," and midterm update values of coverage term limit "Towing and Labor Limit" and Covered Object Fields BasisAmount or LicensePlate.

FIG. 20 shows and example of a user interface presenting a list of insurance policy forms that have been inferred for Jimbo Jones. For example, list of inferred insurance policy forms 2002 can be determined by applying a process such as process 1600 to the policy instance for Jimbo Jones that was shown in part in FIG. 18. For example, during the process 1600, a match was determined between the insurance product definition templates of Towing and Labor coverage 1806 and associated coverage term limit of $100 1810 included in the policy instance for Jimbo Jones and the mapping shown in the inference logic for form "PP 0004" of FIG. 19. As such, form "PP 0004" appears (among other insurance policy forms) at row 2004 of list of inferred insurance policy forms inferred and to be printed for Jimbo Jones. The forms in the other rows (e.g., Form #s "1," "1Copy," "1CopyCopy," "PA 00DS," "PA 0208," "PA 0272," and "PF 01,") are also similarly inferred for Jimbo Jones based on a set of inference logic associated with each form and at least a portion of Jimbo Jones's policy instance.

Figure 21:
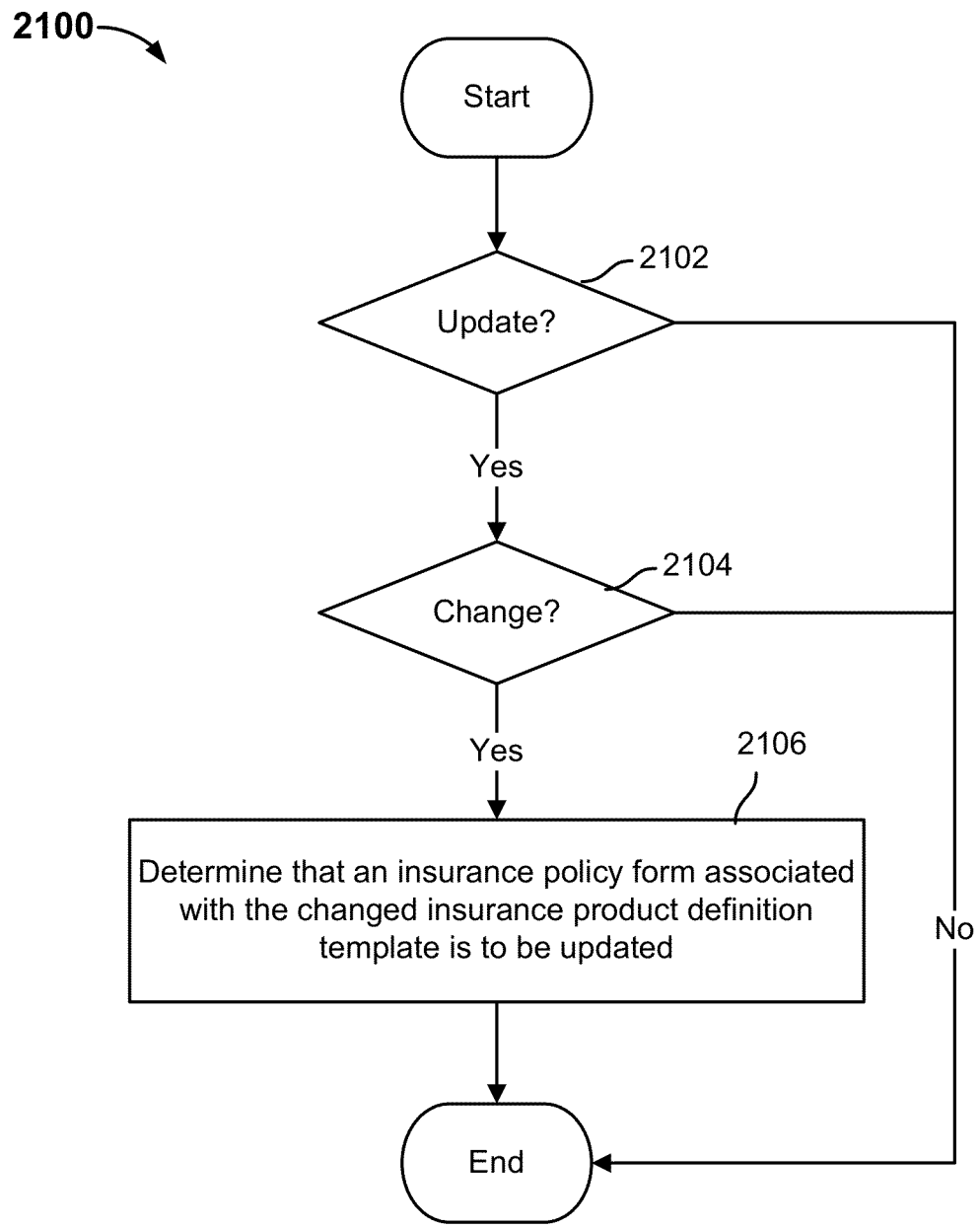
FIG. 21 is a flow diagram showing an embodiment of a process for updating an inferred form at the occurrence of a configured event.

FIG. 21 is a flow diagram showing an embodiment of a process for updating an inferred form at the occurrence of a configured event. In some embodiments, process 2100 is implemented at system 200.

At 2102, it is determined whether a configured update event has occurred. An example of such an event could be the redetermination of policy premium due to requested changes to the policy instance by the policy holder midway through the overall effective coverage period of the policy instance. So in this example, if it is determined that policy premium is being redetermined midway through the effective coverage period, then process 2100 proceeds to 2104. Otherwise, process 2100 ends.

At 2104, it is determined whether an insurance product definition template included in the policy instance has changed since a prior inference determination. For example, one or more insurance product definition templates associated with an insurance policy form can be configured to be monitored on a policy instance for which the form was previously inferred such that upon an update event, it is determined whether these monitored insurance product definition templates have changed since the previous inference determination. If so, then process 2100 proceeds to 2106. Otherwise, process 2100 ends.

At 2106, it is determined that the insurance policy form associated with the changed insurance product definition template is to be updated. Because the insurance product definition template has changed at a policy instance for which the form was previously inferred, the form needs to be updated accordingly with the changed version of the insurance product definition template for that policy instance. The updated insurance policy form is then created and sent to the policyholder or other parties associated with the policy instance.

Figure 22:
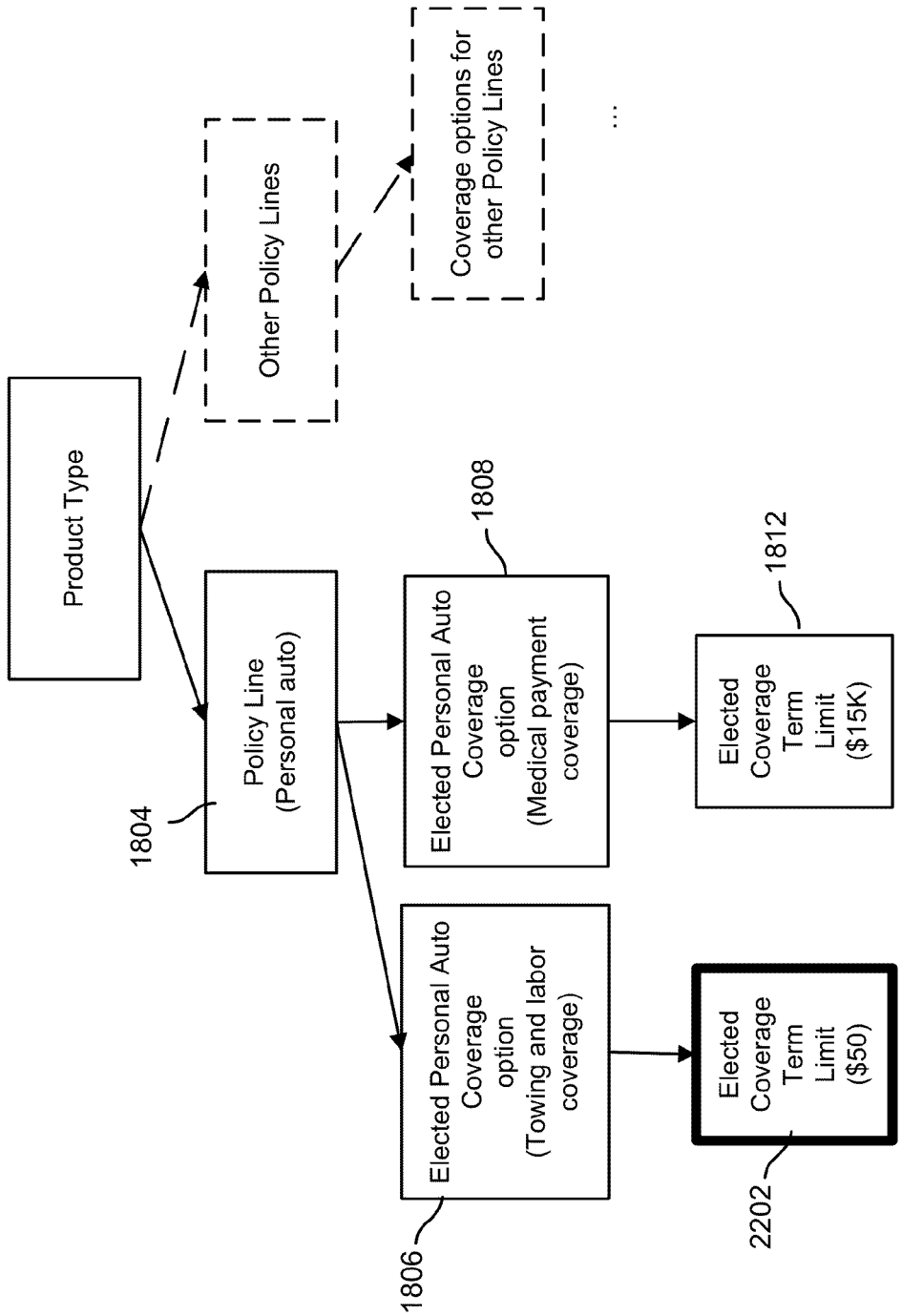
FIG. 22 is an example of a representation of an updated policy instance with a changed coverage term limit for the Towing and Labor coverage.

FIG. 22 is an example of a representation of an updated policy instance with a changed coverage term limit for the Towing and Labor coverage. The example includes the same policy instance for Jimbo Jones as that in FIG. 18 but with elected coverage term limit $100 1810 changed to elected coverage term limit $50 2202 for Towing and Labor coverage 1806.

As mentioned in a previous example, form "PP 0004" as described in FIG. 19 has already been inferred for the policy instance of FIG. 18. Midway through the effective coverage period of the policy instance, the policy instance of FIG. 18 has been updated to the policy instance of FIG. 22. By applying a process such as process 2100 and referring to FIG. 19, the midterm update values for previously inferred form "PP 0004" included coverage term limit "Towing and Labor Limit," which has since changed from $100 to $50 at the updated policy instance. As such, form "PP 0004" is to be updated with the new coverage term limit of $50 (as shown in insurance product definition template 2202) for the Towing and Labor coverage and sent again to Jimbo Jones.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for providing configuration of inference logic for insurance policy forms, comprising:
   one or more computer processors configured to:
      present to a user:
         information associated with an insurance policy form; and
         a set of inference rule types, each inference rule type specifying a corresponding condition under which the form is to be created;
      receive a selected inference rule type;
      present a set of insurance product definition templates;
      receive a selected insurance product definition template corresponding to the selected inference rule type, the selected insurance product definition template being selected from the set of insurance product definition templates; and
      store a mapping associated with the insurance policy form, wherein the mapping includes at least the selected inference rule type and the selected insurance product definition template; and
   one or more computer memories coupled to the one or more processors and configured to provide the one or more processors with instructions.

2. The system of claim 1, wherein the set of insurance product definition templates is derived from a product model.

3. The system of claim 1, wherein the one or more processors are further configured to present a set of policy lines and receive a selected policy line.

4. The system of claim 3, wherein the set of insurance product definition templates is presented based at least in part on a determination that each of the set of insurance product definition templates is associated with the selected policy line.

5. The system of claim 1, wherein the set of inference rule types include one or more of the following: a particular coverage that is required to be included in a policy instance for which the insurance policy form is to be inferred, a particular exclusion that is required to be included in a policy instance for which the insurance policy form is to be inferred, a particular condition that is required to be included in a policy instance for which the insurance policy form is to be inferred, a particular typelist value that is required to be included in a policy instance for which the insurance policy form is to be inferred, no additional criteria, and an association with another insurance policy form.

6. The system of claim 1, wherein the one or more processors are further configured to receive a selection associated with an insurance product definition template potentially associated with a policy instance and wherein the selected insurance product definition template is to be to be monitored for change at an update event.

7. The system of claim 1, wherein the one or more processors are further configured to:
receive information associated with a policy instance associated with the policyholder, wherein the information includes at least an insurance product definition template;
compare at least the insurance product definition template included in the policy instance to the stored mapping including the selected inference rule type, a corresponding selected insurance product definition template, and the insurance policy form; and
in the event that the insurance product definition template included in the policy instance matches the selected insurance product definition template included in the mapping, determine that the insurance policy form included in the mapping is inferred and to be created for the policy instance.

8. The system of claim 7, wherein at least a portion of the information associated with the policy instance is derived from a product model.

9. The system of claim 7, wherein the one or more processors are further configured to:
determine whether a configured update event has occurred;
in the event that the update event has occurred, determine whether an insurance product definition template included in the policy instance that is selected to be monitored for change has changed.

10. The system of claim 9, wherein the one or more processors are further configured to:
in the event that the insurance product definition template to be monitored has changed, update the insurance policy form with the changed insurance product definition template.

11. The system of claim 1, wherein the one or more processors are further configured to:
receive a customized inference rule type and a corresponding set of selections to be presented at the user interface.

12. A method of providing configuration of inference logic for insurance policy forms, comprising:

presenting to a user:
information associated with an insurance policy form; and
a set of inference rule types, each inference rule type specifying a corresponding condition under which the form is to be created;
receiving a selected inference rule type;
presenting a set of insurance product definition templates;
receiving a selected insurance product definition template corresponding to the selected inference rule type, the selected insurance product definition template being selected from the set of insurance product definition templates; and
storing, using one or more processors, a mapping associated with the insurance policy form, wherein the mapping includes at least the selected inference rule type and the selected insurance product definition template.

13. The method of claim 12, wherein the set of insurance product definition templates is derived from a product model.

14. The method of claim 12, wherein the one or more processors are further configured to present a set of policy lines and receive a selected policy line.

15. The method of claim 12, further comprising:
receiving information associated with a policy instance associated with the policyholder, wherein the information includes at least an insurance product definition template;
comparing at least the insurance product definition template included in the policy instance to the stored mapping including the selected inference rule type, a corresponding selected insurance product definition template, and the insurance policy form; and
in the event that the insurance product definition template included in the policy instance matches the selected insurance product definition template included in the mapping, determining that the insurance policy form included in the mapping is inferred and to be created for the policy instance.

16. The method of claim 15, wherein at least a portion of the information associated with the policy instance is derived from a product model.

17. The method of claim 15, further comprising:
determining whether a configured update event has occurred;
in the event that the update event has occurred, determining whether an insurance product definition template included in the policy instance that is selected to be monitored for change has changed.

18. The method of claim 17, further comprising:
in the event that the insurance product definition template to be monitored has changed, updating the insurance policy form with the changed insurance product definition template.

19. The method of claim 12, further comprising:
receiving a customized inference rule type and a corresponding set of selections to be presented at the user interface.

20. A computer program product for providing configuration of inference logic for insurance policy forms, the computer program product being embodied in a non-transitory computer readable medium and comprising computer instructions for:
presenting to a user:
information associated with an insurance policy form; and a set of inference rule types, each inference rule type specifying a corresponding condition under which the form is to be created;

receiving a selected inference rule type;

presenting a set of insurance product definition templates;

receiving a selected insurance product definition template corresponding to the selected inference rule type, the selected insurance product definition template being selected from the set of insurance product definition templates; and storing a mapping associated with the insurance policy form, wherein the mapping includes at least the selected inference rule type and the selected insurance product definition template.

* * * * *